(12) United States Patent
Imamura et al.

(10) Patent No.: US 10,730,440 B2
(45) Date of Patent: Aug. 4, 2020

(54) DISPLAY SYSTEM, ELECTRONIC MIRROR SYSTEM, AND MOVING BODY

(71) Applicant: Panasonic Intellectual Property Management Co., Ltd., Osaka (JP)

(72) Inventors: Norihiro Imamura, Osaka (JP); Shoji Soh, Osaka (JP); Katsuyuki Morita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/987,677

(22) Filed: May 23, 2018

(65) Prior Publication Data

US 2018/0345867 A1 Dec. 6, 2018

(30) Foreign Application Priority Data

May 31, 2017 (JP) .................. 2017-108705
May 31, 2017 (JP) .................. 2017-108706

(51) Int. Cl.
*B60R 1/12* (2006.01)
*H04N 13/385* (2018.01)
(Continued)

(52) U.S. Cl.
CPC ............... *B60R 1/12* (2013.01); *B60R 1/04* (2013.01); *H04N 5/23219* (2013.01);
(Continued)

(58) Field of Classification Search
CPC ........ H04N 7/181; H04N 7/18; H04N 13/376; H04N 13/385; H04N 5/23296;
(Continued)

(56) References Cited

U.S. PATENT DOCUMENTS 5,469,298 A * 11/1995 Suman ................. G02B 27/01
359/630
7,199,767 B2 * 4/2007 Spero ...................... G02B 5/20
345/7
(Continued)

FOREIGN PATENT DOCUMENTS

JP 2009-083618 4/2009
JP 2009-100180 A 5/2009
(Continued)

OTHER PUBLICATIONS

Funscience (http://www.funscience.in/study-zone/Physics/ReflectionOfLight/FormationOfImagesByConcaveMirror.php) (Year: 2016).*

(Continued)

*Primary Examiner* — Dramos Kalapodas
(74) *Attorney, Agent, or Firm* — Greenblum & Bernstein, P.L.C.

(57) ABSTRACT

A display system includes a display surface and a display mirror. The display surface is configured to display image P1 based on a captured image. The display mirror is configured to reflect, as reflection image P2, only a partial area in the image displayed on the display surface. The display system is configured so that a position of reflection image P2 changes as a point of view of a subject viewing the display mirror moves.

9 Claims, 17 Drawing Sheets

(51) Int. Cl.
*B60R 1/04* (2006.01)
*H04N 5/232* (2006.01)
*H04N 13/30* (2018.01)
*H04N 13/376* (2018.01)
*H04N 7/18* (2006.01)

(52) U.S. Cl.
CPC .......... *H04N 5/23296* (2013.01); *H04N 7/18* (2013.01); *H04N 7/181* (2013.01); *H04N 13/30* (2018.05); *H04N 13/376* (2018.05); *H04N 13/385* (2018.05); *B60R 2001/1215* (2013.01); *B60R 2001/1253* (2013.01); *H04N 5/23293* (2013.01)

(58) Field of Classification Search
CPC ............... H04N 5/23219; H04N 13/30; H04N 5/23293; H04N 5/64; B60R 1/04; B60R 2001/1215; B60R 2001/1253; B60R 1/12
See application file for complete search history.

(56) References Cited

U.S. PATENT DOCUMENTS

| | | | | |
|---|---|---|---|---|
| 8,564,662 B2* | 10/2013 | Busch | ...................... | B60R 1/00 348/148 |
| 10,546,561 B2* | 1/2020 | Kusanagi | ............... | B60K 35/00 |
| 2002/0003571 A1* | 1/2002 | Schofield | ................ | B60C 23/00 348/148 |
| 2003/0095182 A1* | 5/2003 | Imoto | .................... | H04N 7/183 348/148 |
| 2003/0122930 A1* | 7/2003 | Schofield | .................. | B60R 1/00 348/148 |
| 2009/0284598 A1 | 11/2009 | Busch et al. | | |
| 2012/0154591 A1* | 6/2012 | Baur | ......................... | B60R 1/00 348/148 |
| 2014/0307343 A1* | 10/2014 | Joe | .......................... | H04N 7/18 359/838 |
| 2015/0042799 A1* | 2/2015 | Zhang | ................. | G06K 9/00805 348/148 |
| 2017/0129405 A1* | 5/2017 | Oba | ......................... | B60R 1/00 |
| 2017/0307883 A1* | 10/2017 | Yamasaki | .............. | B60K 35/00 |

FOREIGN PATENT DOCUMENTS

| | | |
|---|---|---|
| JP | 2009-120080 A | 6/2009 |
| JP | 2009-542505 A | 12/2009 |
| JP | 2016-040140 A | 3/2016 |
| JP | 2016-071062 A | 5/2016 |

OTHER PUBLICATIONS

Japanese Office Action dated Dec. 24, 2019 for the related Japanese Patent Application No. 2017-108705.
Japanese Office Action dated Dec. 24, 2019 for the related Japanese Patent Application No. 2018-104079.

* cited by examiner

DISPLAY SYSTEM, ELECTRONIC MIRROR SYSTEM, AND MOVING BODY

TECHNICAL FIELD

The present disclosure generally relates to display systems, electronic mirror systems, and moving bodies, and, in particular, relates to a display system, an electronic mirror system, and a moving body, each configured to display an image based on a captured image.

BACKGROUND ART

Such a conventional electronic mirror system is known that includes an imaging device configured to capture a rear or side view image of a vehicle, and a display device configured to display, as an image, an image signal output from the imaging device (PTL 1). Here, the display device is disposed, inside the vehicle, at a position allowing a driver to easily view an image on the display device. A liquid crystal display, for example, constitutes the display device.

CITATION LIST

Patent Literature

PTL 1: Unexamined Japanese Patent Publication No. 2009-83618

SUMMARY OF THE INVENTION

In the electronic mirror system described in PTL 1, a person viewing an image displayed on the liquid crystal display is less likely to acquire a sense of solidity.

The present disclosure has an object to provide a display system, an electronic mirror system, and a moving body, each capable of providing a sense of solidity to a person viewing a displayed image.

A display system according to one aspect of the present disclosure includes a display surface and a display mirror. The display surface is configured to display an image based on a captured image. The display mirror is configured to reflect, as a reflection image, only a partial area in the image displayed on the display surface. The display system is configured so that a position of the reflection image changes as a point of view of a subject viewing the display mirror moves.

An electronic mirror system according to one aspect of the present disclosure includes the above described display system, and a camera configured to output the captured image to the display system.

A moving body according to one aspect of the present disclosure includes the above described electronic mirror system, and a moving body main body mounted with the electronic mirror system.

The present disclosure is capable of advantageously providing a sense of solidity to a person viewing a displayed image.

DESCRIPTION OF EMBODIMENTS

Figure 1:
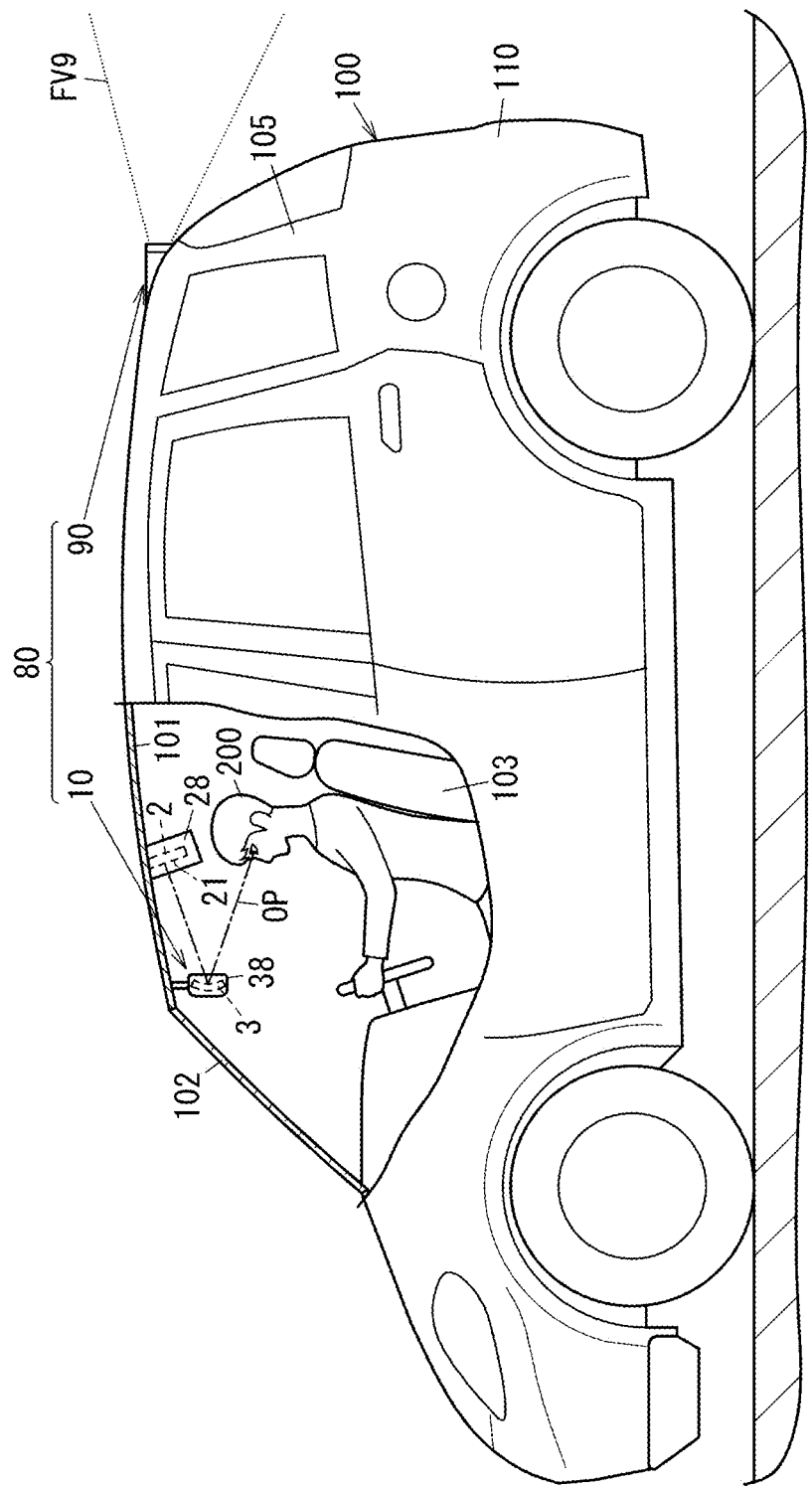
FIG. 1 is a conceptual diagram of a vehicle equipped with a display system according to a first exemplary embodiment and a third exemplary embodiment.

FIGS. 1 to 22 described in below exemplary embodiments, modifications, and comparative example, are merely conceptual diagrams. Ratios in size and thickness of components in the drawings do not always reflect actual dimensional ratios.

First Exemplary Embodiment (1) Outline

Display system 10 according to the present exemplary embodiment is, as illustrated in FIG. 1, a system used in vehicle 100 representing a moving body, for example.

Display system 10 is mounted on main body (moving body main body) 110 of vehicle 100. In display system 10, when image P1 (see FIG. 5B) based on a captured image is displayed on display surface 21, image (hereinafter also referred to as reflection image) P2 (see FIG. 5B) reflected by display mirror 3 is viewed by user 200 (driver of vehicle 100) who is a subject viewing display mirror 3. Display mirror 3 is disposed, proximal to windshield 102, on a front side portion of ceiling portion 101 of main body 110, at a position in a viewing field of user 200, when user 200 seated on front seat 103 faces forward (see FIG. 1). A captured image is output from camera (imaging device) 90 configured to capture a rear view image of vehicle 100. Camera 90 is mounted on main body 110 of vehicle 100. User 200 views reflection image P2 with display mirror 3. Therefore, user 200 views as if a part of image P1 on display surface 21 is displayed in a space that is distal from display mirror 3, based on their eyes (eye balls) 201 (see FIG. 2). In other words, user 200 views as if, in a direction in which user 200 can view display mirror 3, virtual image 301 (see FIGS. 2 and 5A) of a part of image P1 on display surface 21 is displayed at a position in front of vehicle 100.

With the electronic mirror system described in PTL 1, however, a driver of a vehicle views an actual image displayed on a display device including a liquid crystal display. Therefore, for the driver, for example, a distance difference between a distance to a position at which eyes focus on when viewing a road situation in front of the vehicle and a distance to a position at which the eyes focus on when viewing an image on the display device becomes greater, thus increasing an amount of focus adjustment and extending a time for focusing (focal point adjustment).

Figure 2:
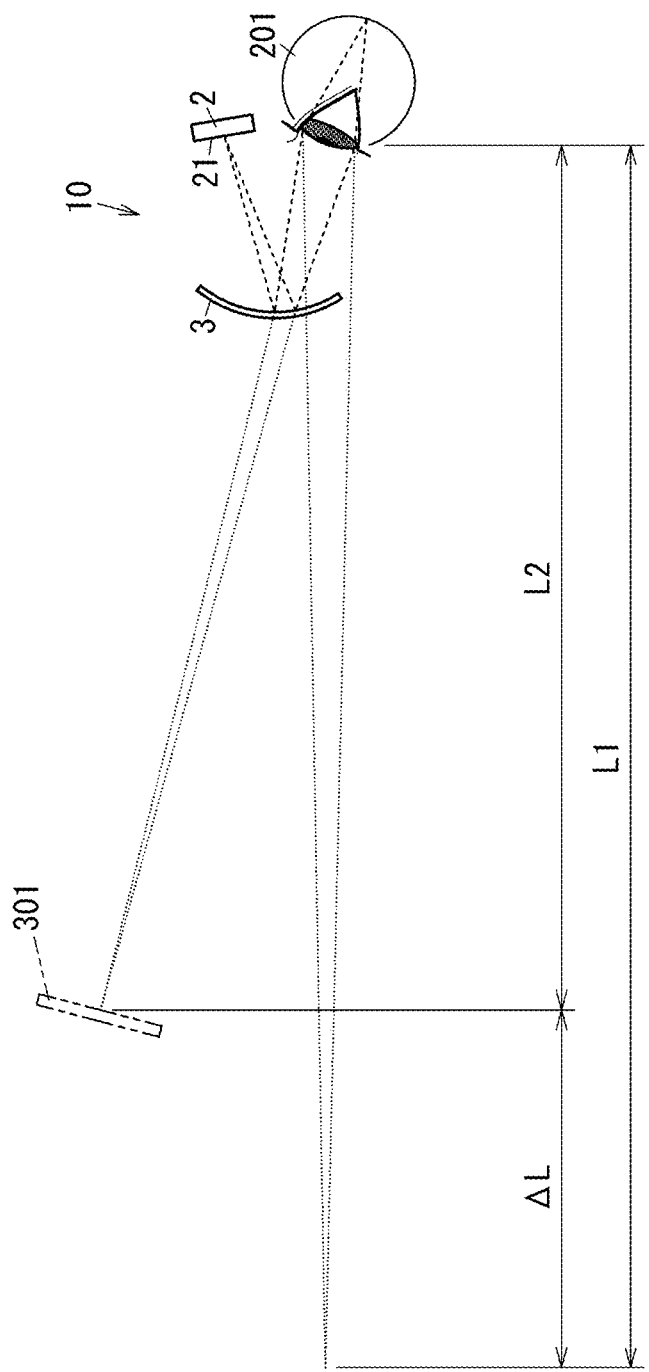
FIG. 2 is a conceptual diagram illustrating a focal point of an eye of a user when the display system according to the first exemplary embodiment is used.

On the other hand, with display system 10, as illustrated in FIG. 2, distance difference ΔL between distance L1 to a position at which eyes 201 focus on when viewing a road situation in front of vehicle 100 and distance L2 to a position at which eyes 201 focus on when viewing virtual image 301 becomes smaller. Therefore, with display system 10, user 200 can reduce an amount of focus adjustment, as well as user 200 can shorten a time for focusing. With display system 10, even when user 200 is aged or far sighted, for example, and accordingly faces difficulty in focusing on a position at a relatively shorter distance, an easy focus adjustment can be achieved.

Display system 10 is configured so that a position of reflection image P2 showed as virtual image 301 at a distal position changes as a point of view of user 200 viewing display mirror 3 (eyes 201 of user 200) moves. Therefore, display system 10 is capable of advantageously providing a sense of solidity on another vehicle, for example, running behind user 200 viewing virtual image 301, compared with a case when a driver directly views a display device displaying, as an image, an image signal output from an imaging device.

(2) Configuration (2.1) Whole Configuration of Display System

Display system 10 according to the present exemplary embodiment includes, as illustrated in FIGS. 1 to 6B and FIG. 14, display unit (image forming unit) 2 and display mirror 3. Display unit 2 has display surface 21. Display system 10 further includes a controller (not illustrated) configured to control display unit 2.

Display surface 21 is configured to display image P1 based on a captured image output from camera 90. Camera 90 is not a component of display system 10. An image element in camera 90 is a Complementary MOS (CMOS) image sensor. The image element is not limited to the CMOS image sensor, but may be a Charge Coupled Device (CCD) image sensor, for example.

Figure 14:
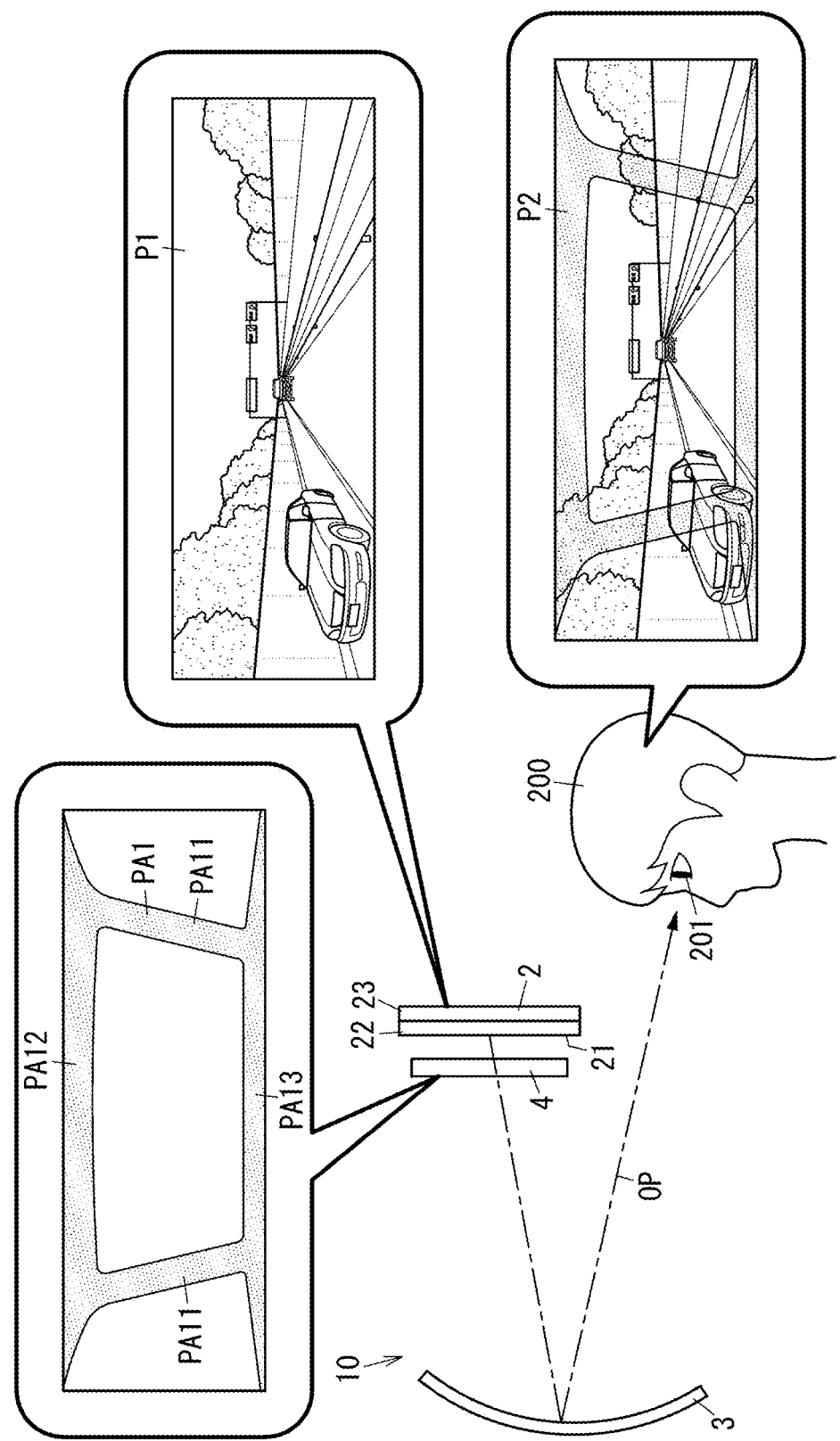
FIG. 14 is a conceptual diagram illustrating a configuration of the display system according to the third exemplary embodiment.

Display unit 2 outputs light to form an image. Display unit 2 includes, as illustrated in FIG. 14, liquid crystal panel 22 (Liquid Crystal Display or LCD) and light source device 23. Liquid crystal panel 22 is disposed in front of light source device 23. Light source device 23 is used as a backlight for liquid crystal panel 22. Light source device 23 is a surface light source. Light source device 23 is a side light type light source device using a solid light-emitting element, such as a light emitting diode or a laser diode. Light from light source device 23 passes through liquid crystal panel 22, and is output from display surface 21 of display unit 2. Light output from display surface 21 is light reflecting an image displayed on liquid crystal panel 22. FIG. 14 schematically illustrates an advancing path (optical path OP) of light (output light) output from a point (pixel point) on image P1 displayed on display surface 21 of display unit 2.

In display system 10, a lengthwise of liquid crystal panel 22 represents a lengthwise of reflection image P2, while a widthwise of liquid crystal panel 22 represents a widthwise of reflection image P2. The lengthwise of reflection image P2 represents a lengthwise of virtual image 300 (see FIGS. 5A and 6A), in other words, a direction along a vertical direction in a visual field of user 200. The widthwise of reflection image P2 represents a widthwise of virtual image 300 of image P1, in other words, a direction along a horizontal direction in the visual field of user 200.

The controller controls display unit 2 (liquid crystal panel 22 and light source device 23). Here, the controller acquires a captured image output from camera 90, and causes display unit 2 to display image P1 based on the captured image. The captured image is a rear view image of vehicle 100 captured and generated by camera 90 mounted on a rear portion of vehicle 100. As an example, the controller causes display unit 2 to display, as image P1, an acquired captured image as is. Here, camera 90 is disposed on the rear portion of vehicle 100 at a center in a left-right direction. Therefore, camera 90 can capture an area behind camera 90 (within visual field FV9 of camera 90 in FIG. 1). Display system 10 can be applied to electronic mirror system 80. Electronic mirror system 80 includes display system 10, and camera 90 configured to output a captured image to display system 10. Electronic mirror system 80 can be used as an inside mirror of vehicle 100.

The controller includes, for example, a microcomputer mainly including a Central Processing Unit (CPU) and a memory. In other words, the controller is achieved by using a computer including a CPU and a memory. The CPU executes a program stored in the memory, allowing the computer to function as the controller. Herein, the program is recorded in advance in the memory of the controller. However, the program may be provided via a telecommunication line such as the Internet or by being recorded in a recording medium such as a memory card.

Display mirror 3 is a concave mirror. Display mirror 3 includes, as an example, a glass base material, and a reflection film formed on a concave surface of the base material. The reflection film is a metal film, for example.

Display mirror 3 is configured to reflect image P1 displayed on display surface 21. Display mirror 3 in display system 10 reflects, as reflection image P2, only a partial area in image P1 displayed on display surface 21.

Figure 4:
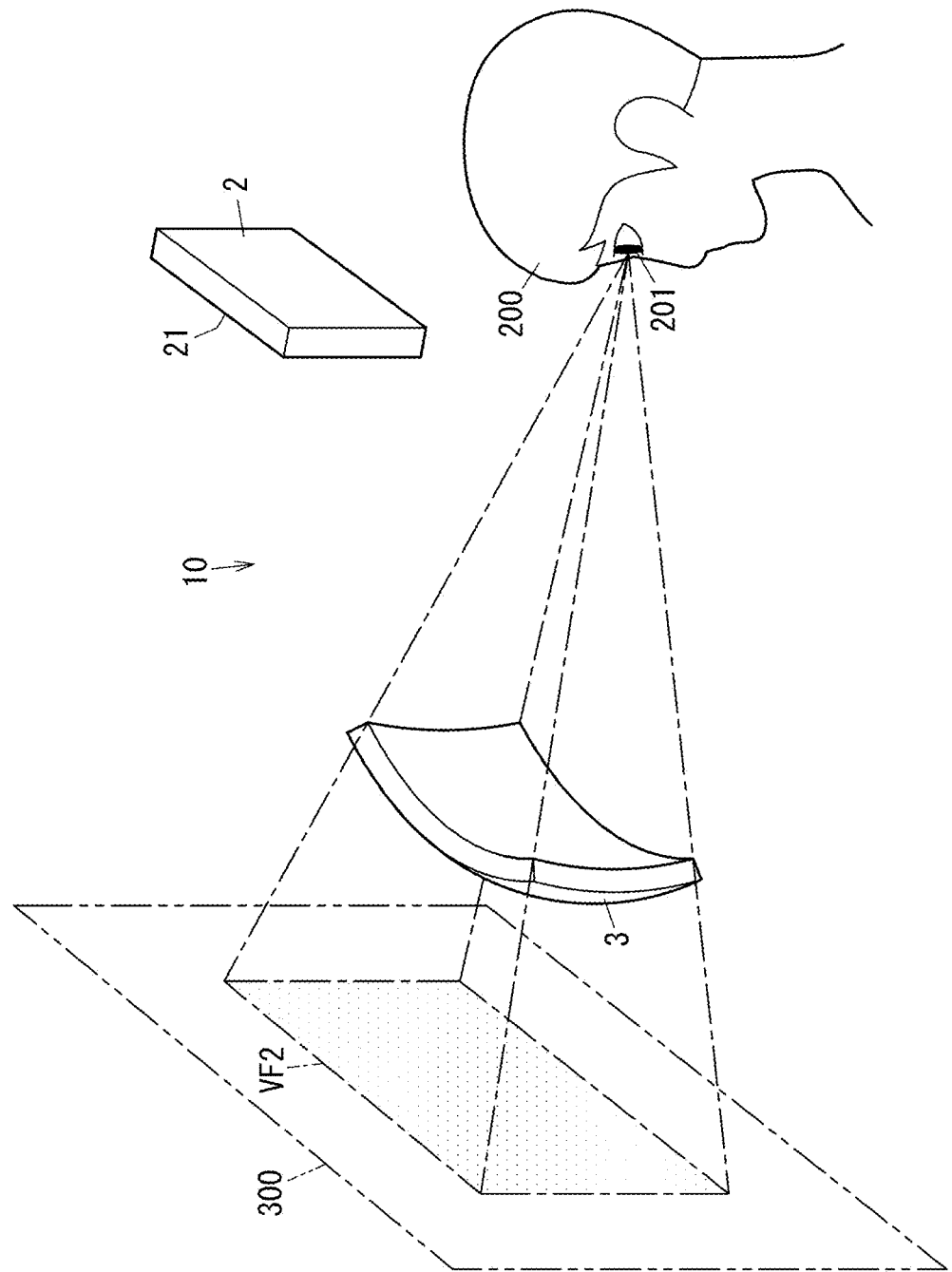
FIG. 4 is a conceptual diagram illustrating a relationship between a visual field of the user of the display system according to the first exemplary embodiment and a virtual image of an image displayed on a display surface.

In display system 10, as illustrated in FIG. 4, a size of display mirror 3 is determined so that a size of virtual image 300, with respect to whole image P1, on a virtual plane in a space away from user 200 is greater than a size of visual field VF2 of eyes 201 of user 200, which is determined by display mirror 3. Here, in display system 10, the size of display mirror 3 is determined so that an outer peripheral line of visual field VF2 on the above described virtual plane lies inside an outer peripheral line of virtual image 300. Therefore, display system 10 is configured so that a position of reflection image P2 changes as eyes 201 of user 200 (subject) viewing display mirror 3 move (see FIGS. 5A, 5B, 6A, and 6B). Here, reflection image P2 has a less number of pixels than a number of pixels in image P1 in both the lengthwise and the widthwise of image P1.

For description purposes, two eyes 201 of user 200 hereinafter may be referred to as right eye 201R and left eye 201L to distinguish from each other. In below descriptions with reference to FIGS. 5A and 6A, the term "right side" refers to a right side when viewed by user 200, while the term "left side" refers to a left side when viewed by user 200.

Figure 5A:
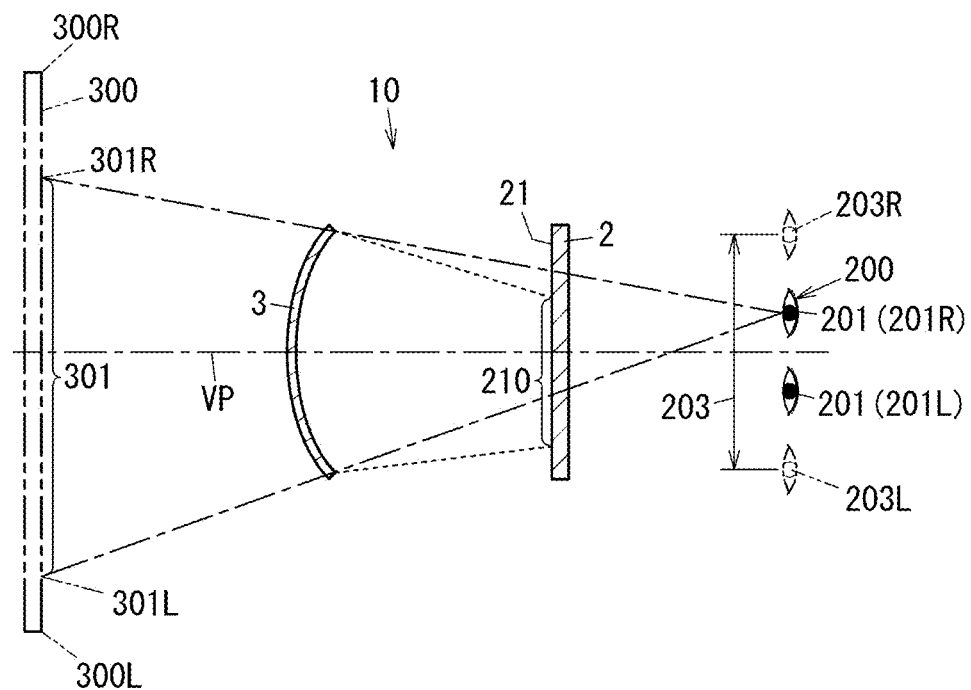
FIG. 5A is a conceptual diagram illustrating a relationship between a visual field of the user of the display system according to the first exemplary embodiment and a virtual image of an image displayed on the display surface.
Figure 5B:
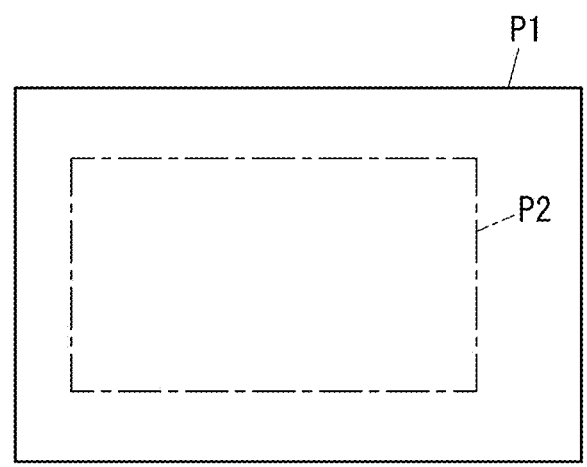
FIG. 5B is a conceptual diagram of a relative positional relationship between an image in the above described display system and an image reflected by the display mirror.
Figure 6A:
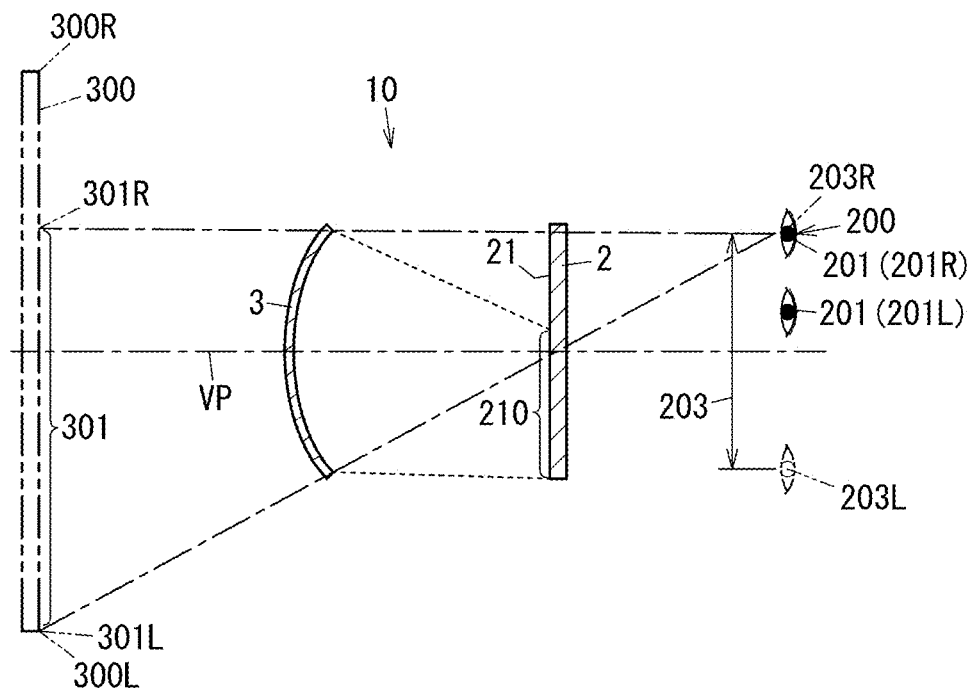
FIG. 6A is a conceptual diagram illustrating a relationship between a visual field of the user of the display system according to the first exemplary embodiment and a virtual image of an image displayed on the display surface.
Figure 6B:
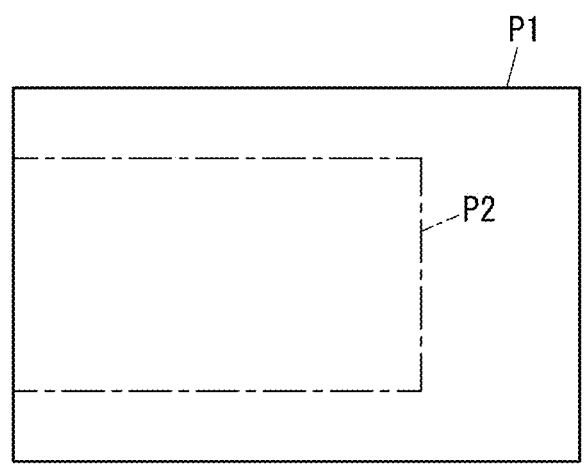
FIG. 6B is a conceptual diagram of a relative positional relationship between an image in the display system according to the first exemplary embodiment and an image reflected by the display mirror.

FIG. 5A is a conceptual diagram when a center point of a straight line connecting right eye 201R and left eye 201L of user 200 and a center of display surface 21 both lie within vertical surface VP. FIG. 6A is a conceptual diagram when the center point of the straight line connecting right eye 201R and left eye 201L of user 200 moves rightward from the position in FIG. 5A, and right eye 201R moves to a right end of eye-box 203. The term "eye-box 203" used herein denotes an area within which user 200 can view an image without any omissions. More specifically, the term "eye-box 203" used herein denotes an area of view in a whole visual field of eyes 201, in which a part of virtual image 300 is reflected. In display system 10, when eyes 201 of user 200 are within an area of eye-box 203, reflection image P2 is within image P1, as illustrated in FIGS. 5B and 6B.

As illustrated in FIGS. 5A and 6A, virtual image 301 formed when display mirror 3 reflects a part of image P1 represents a part of virtual image 300 formed when image P1 displayed on display surface 21 is fully reflected by a concave mirror 30 according to a comparative example (see FIGS. 7 and 8 described below). In FIG. 5A, a central portion of whole virtual image 300 in both an up-down direction and a left-right direction represents virtual image 301 that is viewable by user 200.

FIG. 5A illustrates an area of virtual image 301 in virtual image 300, which is viewable by right eye 201R of user 200. An area of virtual image 301, which is viewable by left eye 201L of user 200, is plane symmetry to the area of virtual image 301, which is viewable by right eye 201R, with respect to vertical surface VP.

As illustrated in FIG. 6A, as the center point on the straight line connecting right eye 201R and left eye 201L of user 200 moves rightward relative to the position illustrated in FIG. 5A, the area of virtual image 301, which is viewable by right eye 201R of user 200 moves leftward. In FIG. 6A, right eye 201R of user 200 lies at right end 203R of eye-box 203, and left end 301L of virtual image 301, which is viewable by right eye 201R of user 200, is in alignment with left end 300L of virtual image 300.

In contrast to FIG. 6A, as the center point on the straight line connecting right eye 201R and left eye 201L of user 200 moves leftward relative to the position illustrated in FIG. 5A, the area of virtual image 301, which is viewable by left eye 201L of user 200, moves rightward. When left eye 201L of user 200 moves to left end 203L of eye-box 203, right end 301R of virtual image 301, which is viewable by left eye 201L of user 200, is in alignment with right end 300R of virtual image 300.

Therefore, in display system 10, when user 200 moves their face in the left-right direction, similar to a case when user 200 views the inside mirror, the areas of virtual image 301, which are respectively viewable by right eye 201R and left eye 201L, change as user 200 moves their face. Here, as long as right eye 201R and left eye 201L of user 200 are within eye-box 203, an image can be viewed without any omissions.

In display system 10, even when user 200 moves their face in the up-down direction, similar to a case when user 200 views the inside mirror, the areas of virtual image 301, which are respectively viewable by right eye 201R and left eye 201L, change as user 200 moves their face. In other words, when user 200 moves their face upward, the areas of virtual image 301, which are respectively viewable by right eye 201R and left eye 201L, move downward, while, when user 200 moves their face downward, the areas of virtual image 301, which are respectively viewable by right eye 201R and left eye 201L, move upward. Here, as long as right eye 201R and left eye 201L of user 200 are within eye-box 203, an image can be viewed without any omissions.

Display system 11 according to the comparative example will now be described with reference to FIGS. 7 and 8.

Display system 11 according to the comparative example is a Head-Up Display (HUD). Display system 11 includes display unit 20 and concave mirror 30, instead of display unit 2 and concave mirror 3 in the first exemplary embodiment. In display system 11, as illustrated in FIGS. 7 and 8, as long as a point of view of user 200 is within eye-box 203, even when eyes 201 of user 200 move, virtual image 300 of a whole image displayed on display surface 211 of display unit 20 is identical to virtual image 311 formed when concave mirror 30 reflects the image.

On the other hand, in display system 10 according to the present exemplary embodiment, display mirror 3 reflects, as reflection image P2, only a partial area in image P1 displayed on display surface 21. Display system 10 is configured so that a position of reflection image P2 changes as the point of view of user 200 viewing display mirror 3 moves. Therefore, display system 10 is capable of advantageously providing a sense of solidity to user 200, compared with a case when a driver directly views a display device displaying, as an image, an image signal output from an imaging device.

In display system 10, it is advantageous that a resolution of image P1 displayed on display surface 21 be higher than a limit resolution of virtual image 300 at a position of virtual image 300 being located. The term "limit resolution of virtual image 300 at a position of virtual image 300 being located" (hereinafter simply referred to as limit resolution) used herein denotes a value determined by a visual distance from eyes 201 of user 200 to virtual image 300 and visual acuity of user 200. A limit resolution refers to a limit value of a resolution identifiable by human's eyes, and can be acquired based on a gap of a Landolt ring used in a visual acuity test, for example. A value of a limit resolution lowers as a visual distance extends longer, and a value of a limit resolution becomes greater as user 200 has higher visual acuity. A limit resolution can be acquired from a predetermined calculating formula with a value of a visual distance from eyes 201 of user 200 to virtual image 300 and a value of visual acuity of user 200. In display system 10 according to the present exemplary embodiment, display mirror 3 expands and displays a part of an image on display surface 21, thus determining, when a limit resolution is determined, a resolution of image P1 on display surface 21 in accordance with the limit resolution, and setting a resolution of image P1 to a value that is higher than a value of the limit resolution. As described above, once a resolution of image P1 on display surface 21 is determined, virtual image 300 is displayed at a resolution that is higher than a limit resolution at a position of virtual image 300 being displayed, thus providing, to user 200 viewing virtual image 300, a sense of depth and a sense of solidity in virtual image 300, as if user 200 is viewing a mirror. In particular, while vehicle 100 is traveling, a high-definition image moves as vehicle 100 moves, and user 200 can further acquire a sense of solidity.

Figure 9:
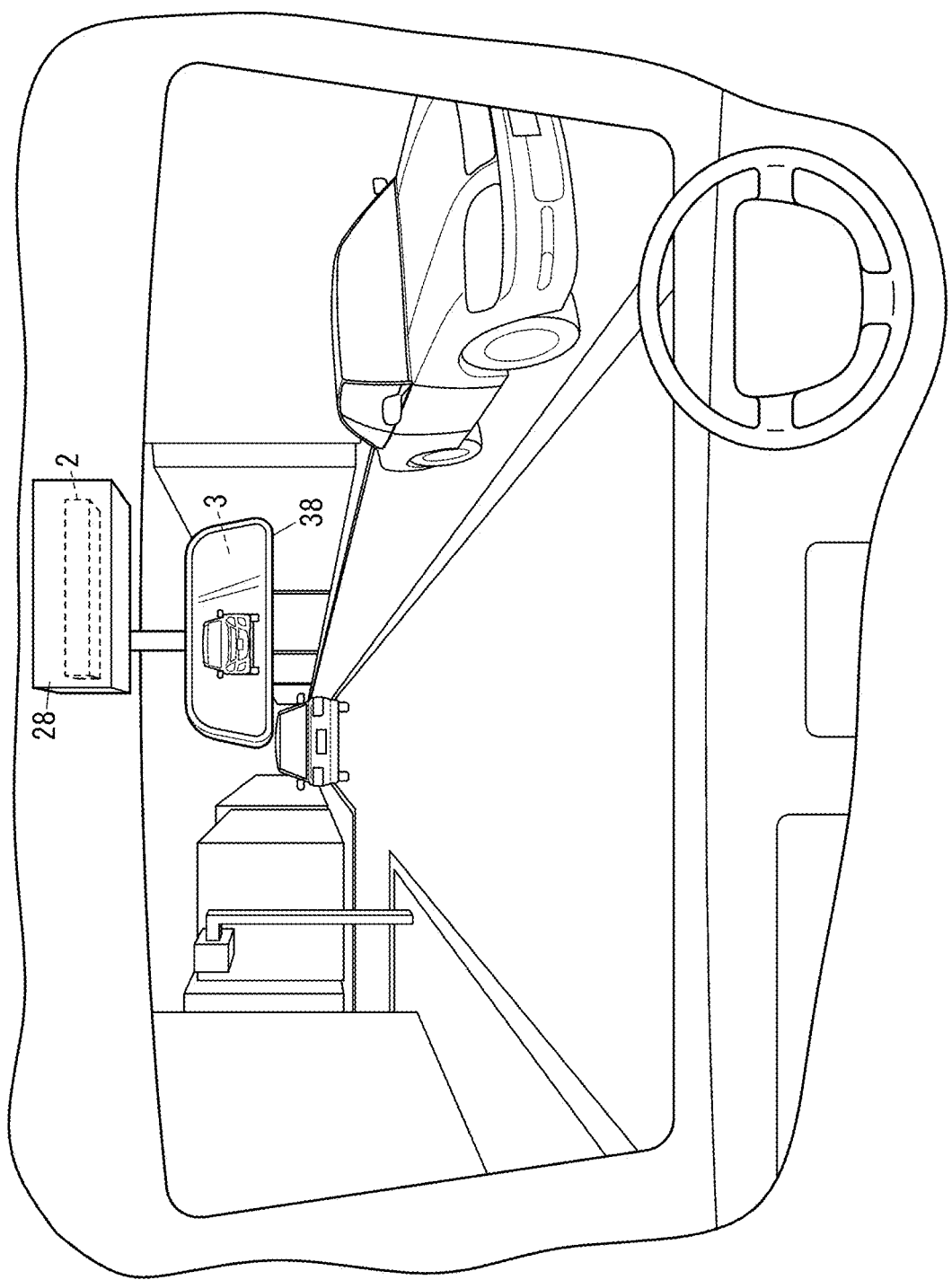
FIG. 9 is a conceptual diagram illustrating a position of a display mirror in a vehicle applied with a display system according to a first modification to the first exemplary embodiment.
Figure 10:
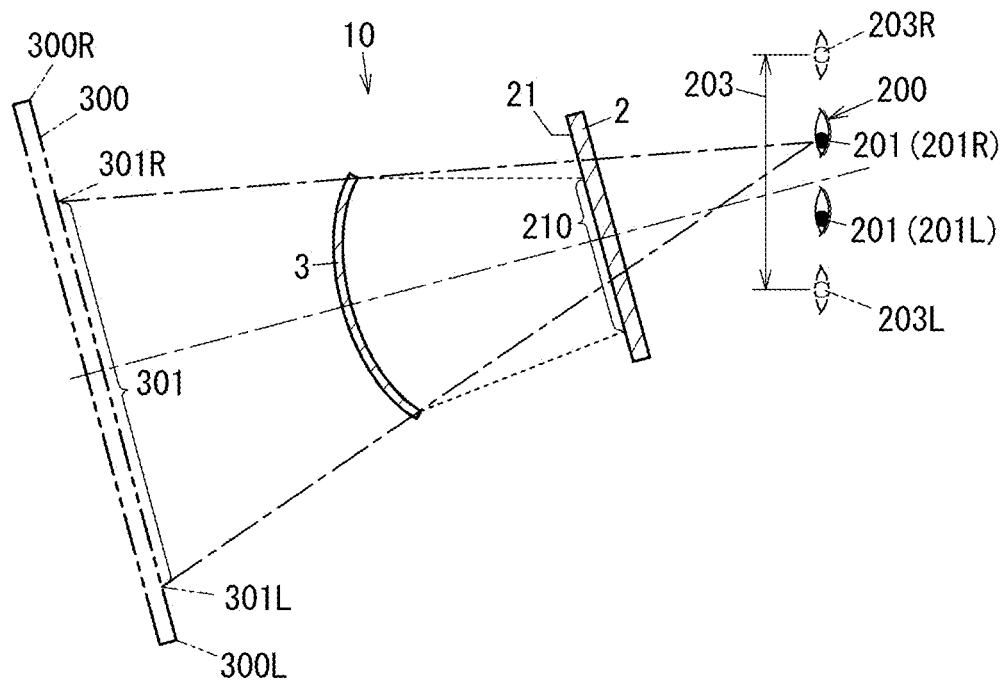
FIG. 10 is a conceptual diagram illustrating a relationship between a visual field of a user of the display system according to the first modification to the first exemplary embodiment and a virtual image of an image displayed on a display surface.
Figure 11:
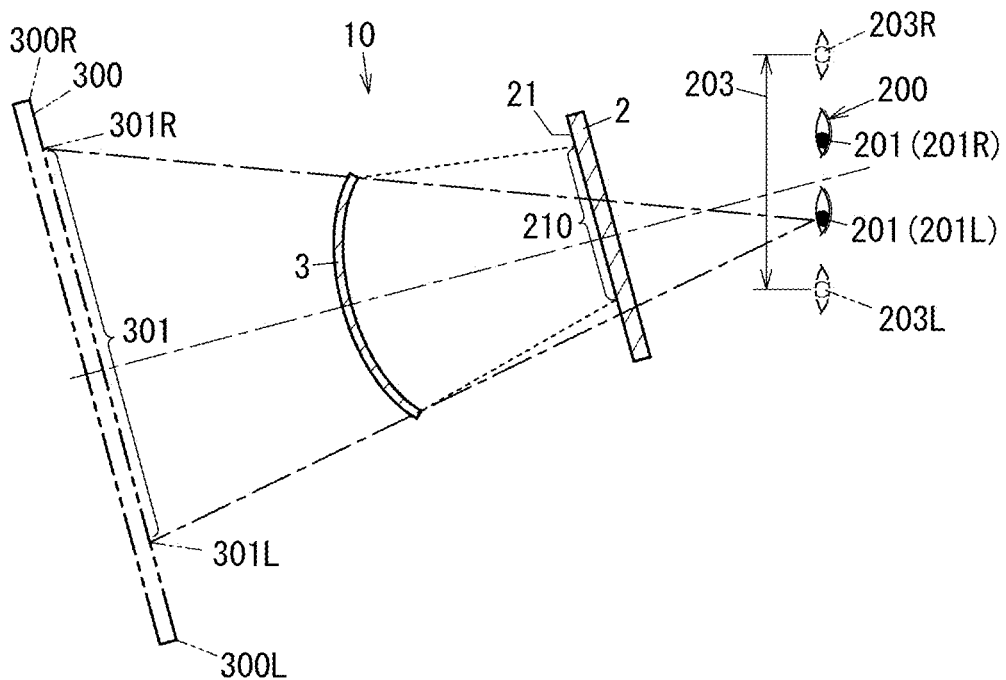
FIG. 11 is a conceptual diagram illustrating a relationship between a visual field of the user of the display system according to the first modification to the first exemplary embodiment and a virtual image of an image displayed on the display surface.

Display system 10 is not limited to a case in which display mirror 3 is disposed in front of user 200, as illustrated in FIGS. 3, 5A, 5B, 6A, and 6B, for example, but may be applied to a case in which display mirror 3 is disposed on a left side in front of user 200, as illustrated in FIGS. 9 to 11, for example. In FIGS. 10 and 11, both left eye 201L and right eye 201R of user 200 face diagonally left forward.

FIG. 10 illustrates an area of virtual image 301 in virtual image 300, which is viewable by right eye 201R of user 200. FIG. 11 illustrates an area of virtual image 301 in virtual image 300, which is viewable by left eye 201L of user 200. In both cases, virtual image 301 is smaller than virtual image 300.

Figure 3:
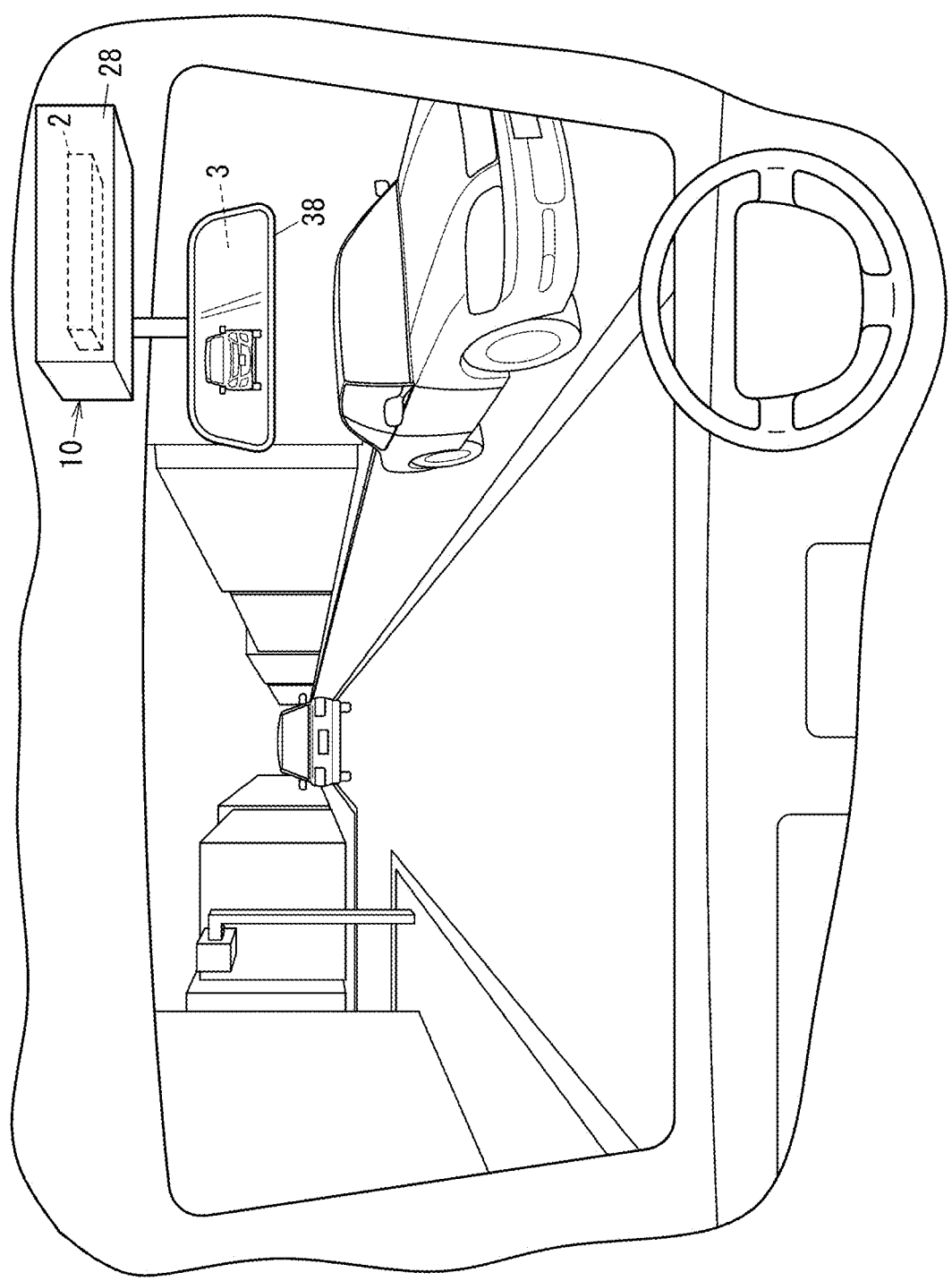
FIG. 3 is a conceptual diagram illustrating a position of a display mirror in the vehicle applied with the display system according to the first exemplary embodiment.

In display system 10, housing 28 accommodating display unit 2 and the controller, and housing 38 accommodating display mirror 3 are separate from each other (see FIG. 3, for example). However, this is merely an example. Display unit 2, the controller, and display mirror 3 may be accommodated in a single housing, for example.

In display system 10, a reflection rate and a penetration rate of display mirror 3 may be respectively specified to 80% and 20%, for example, and, on a back surface of display mirror 3, a display device configured to display a warning icon may be disposed. Therefore, even when the point of view of user 200 moves, the warning icon can be always viewed.

(2.2) Operation of Electronic Mirror System

Operation of electronic mirror system 80 will now be described. For example, when a battery of vehicle 100 supplies power to electronic mirror system 80, and an Electronic Control Unit (ECU) enters a control signal causing electronic mirror system 80 to start operating, electronic mirror system 80 starts operating.

For example, when the ECU of vehicle 100 enters a control signal to the controller, the controller causes camera 90 to capture a rear view image of vehicle 100 at a predetermined frame rate, and acquires image data on the captured image from camera 90.

When the image data on the captured image is entered from camera 90, the controller causes display unit 2 to display, on display surface 21, image P1 based on the captured image.

(3) Mirror Position Adjustment Guide Pattern

Figure 12C:
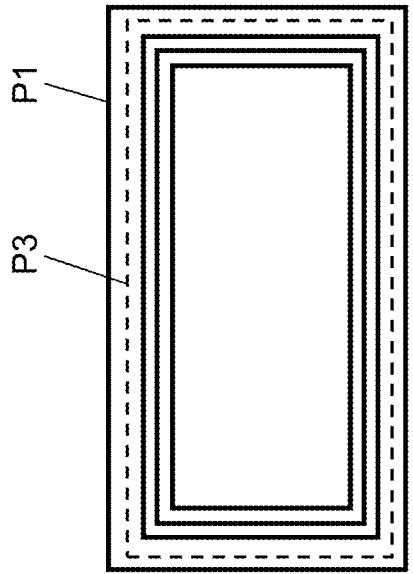
FIG. 12C is a conceptual diagram illustrating a relationship between a guide pattern image displayed on the display surface of the display system according to the first modification to the first exemplary embodiment and a reflection image.
Figure 12D:
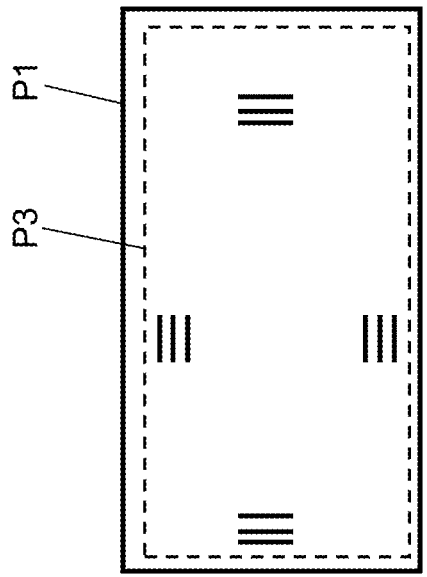
FIG. 12D is a conceptual diagram illustrating a relationship between a guide pattern image displayed on the display surface of the display system according to the first modification to the first exemplary embodiment and a reflection image.
Figure 12A:
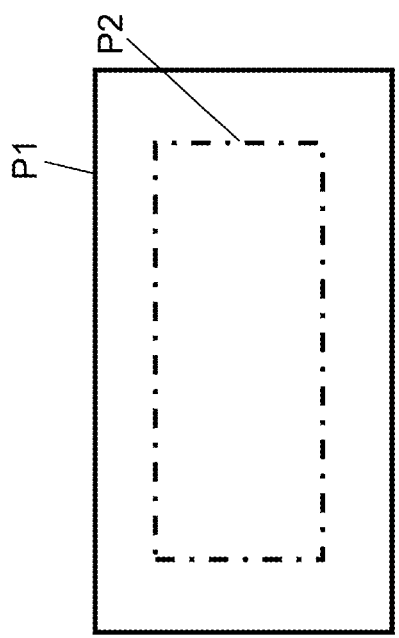
FIG. 12A is a conceptual diagram illustrating a relationship between a guide pattern image displayed on the display surface of the display system according to the first modification to the first exemplary embodiment and a reflection image.
Figure 12B:
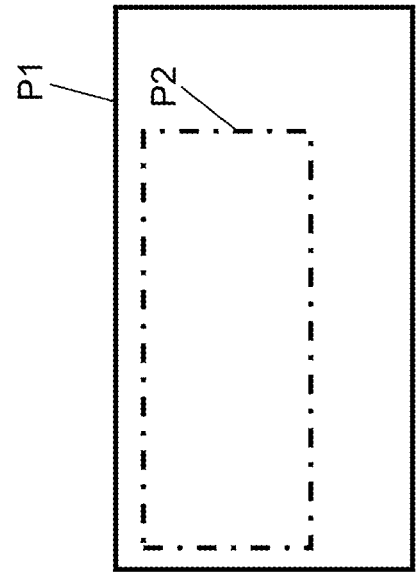
FIG. 12B is a conceptual diagram illustrating a relationship between a guide pattern image displayed on the display surface of the display system according to the first modification to the first exemplary embodiment and a reflection image.

FIG. 12A illustrates how display mirror 3 shows, in display system 10, image P1 based on a captured image and an image reflected by display mirror 3 (hereinafter also referred to as reflection image) P2. As described above, it is advantageous that reflection image P2 be at an approximately center of image P1. However, when a mirror position is adjusted, reflection image P2 might be located at a position inclined with respect to image P1, as illustrated in FIG. 12B. In this case, mirror position adjustment guide pattern P3 is displayed on image P1, as illustrated in FIG. 12C. Mirror position adjustment guide pattern P3 is a triple frame pattern, for example, where inside of the frame is transparent so that reflection image P2 is reflected inside. It is advantageous that a size of the frame be a size fully accommodating reflection image P2. Mirror position adjustment guide pattern P3 may be a single frame or a double frame, as long as an image can be distinguished, or may be a plurality of frames in a plurality of colors, such as, red, yellow, and green, for ease of recognition. As illustrated in FIG. 12D, mirror position adjustment guide pattern P3 may also display parts of respective four sides so as to render vertical and horizontal positions without surrounding a whole periphery. Therefore, a position of display mirror 3 can be adjusted without allowing a position of reflection image P2 to incline with respect to image P1.

(4) Modifications

The first exemplary embodiment is merely one of various exemplary embodiments of the present disclosure. The first exemplary embodiment can be variously modified in accordance with a design, for example, as long as the object of the present disclosure can be achieved.

For example, display unit 2 is not limited to a configuration including liquid crystal panel 22 and light source device 23. Display unit 2 may be configured, with respect to a diffuse transmission type screen, to allow laser light to perform scanning from behind the screen, and to render an image on the screen, for example. Display unit 2 may also be configured, with respect to a diffuse transmission type screen, to allow a projector to project an image from behind the screen, for example. Display unit 2 may also be a light emitting type display panel including an Organic Light Emitting Diode (OLED), for example.

An image based on a captured image is not limited to the captured image itself, but may be an image acquired by image processing the captured image and a Computer Graphics (CG) image created based on the captured image, for example. For example, since an image captured with camera 90 at night becomes darker, an image based on a captured image may be an image acquired by performing a brightness correction on an image captured with camera 90. An image based on a captured image may be an image in which an obstacle is extracted from the captured image with camera 90, and then a Computer Graphics (CG) image illustrating the obstacle is superimposed on the captured image.

In display system 10, a number of pixels in the lengthwise of reflection image P2 is smaller than a number of pixels in the lengthwise of image P1, and a number of pixels in the widthwise of reflection image P2 is smaller than a number of pixels in the widthwise of image P1. However, this is merely an example. For example, in display system 10, only a number of pixels in one of the lengthwise and the widthwise of reflection image P2 may be smaller than a number of pixels in the corresponding direction (lengthwise or widthwise) of image P1.

In vehicle 100, cameras 90 may be disposed so as to capture rear view images of areas on both sides of vehicle 100, which have been viewable with conventional door mirrors or fender mirrors. In this case, electronic mirror system 80 may be used as rear view mirrors for replacements of conventional door mirrors or fender mirrors.

A moving body to which electronic mirror system 80 is applied is not limited to vehicle 100. For example, electronic mirror system 80 is applicable to moving bodies other than vehicle 100, such as motorcycles, trains, airplanes, construction machines, and ships. In other words, a moving body main body is not limited to a vehicle, but may be a main body of a moving body other than vehicle 100, such as a motorcycle, a train, an airplane, a construction machine, or a ship. Further, electronic mirror system 80 may be used in an amusement facility or a medical facility, for example, instead of a moving body.

Second Exemplary Embodiment

Figure 13:
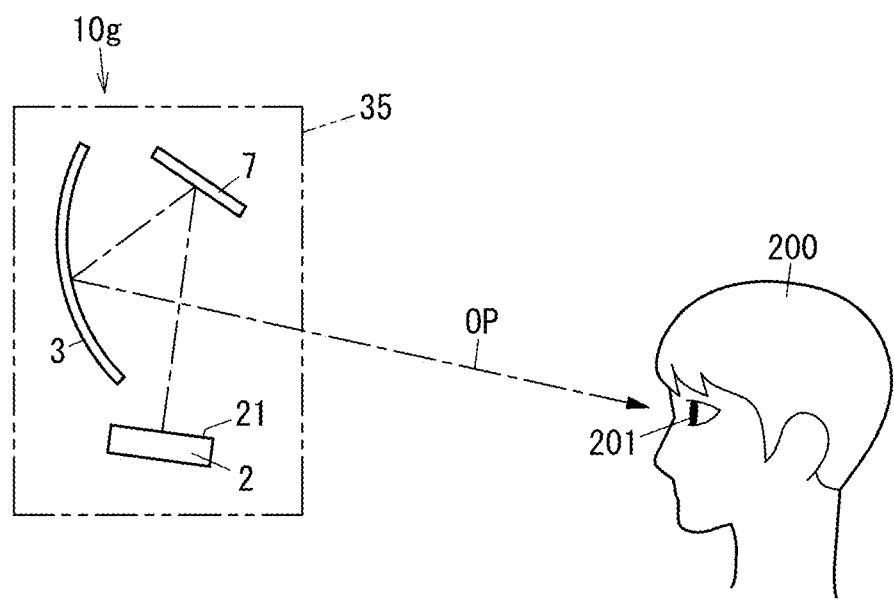
FIG. 13 is a conceptual diagram illustrating a configuration of a display system according to a second exemplary embodiment.

Display system 10g according to the present exemplary embodiment differs from display system 10 according to the first exemplary embodiment in terms of mirror 7 disposed on optical path OP between display surface 21 and display mirror 3, as illustrated in FIG. 13. Hereinafter, elements similar to those in the first exemplary embodiment are given identical reference signs, and description of such elements is omitted as appropriate.

Mirror 7 is configured to reflect, toward display mirror 3, image P1 from display surface 21. Mirror 7 and display mirror 3 are disposed on optical path OP between display surface 21 and display mirror 3 (optical path of light output from display surface 21), in an order of mirror 7 and display mirror 3.

In other words, mirror 7 is disposed on an opposite side to light source device 23, when viewed from liquid crystal panel 22, in other words, in front of liquid crystal panel 22, so that light output from display surface 21 is incident on mirror 7. Mirror 7 reflects, toward display mirror 3, light output from display surface 21. Display mirror 3 is disposed at a position so that light output from display surface 21 and reflected by mirror 7 is incident on display mirror 3. Display mirror 3 reflects light output from display surface 21 and reflected by mirror 7 toward eyes 201 of user 200.

Mirror 7 is a plane mirror. Mirror 7 includes, as an example, a glass base material, and a reflection film made of a metal film formed on a surface of the base material. Therefore, on mirror 7, light output from display surface 21 is reflected on a surface of the reflection film.

In display system 10g according to the present exemplary embodiment, display unit 2, mirror 7, and display mirror 3 are respectively disposed at apex positions of a triangle formed on a vertical surface. The term "vertical surface" used herein denotes a plane containing the lengthwise (vertical direction) of an image displayed on display unit 2 and an advancing direction (optical axis) of output light. In display system 10g, light output from display surface 21 is first reflected by mirror 7, and then further reflected by display mirror 3.

Therefore, in display system 10g according to the present exemplary embodiment, light output from display surface 21 is reflected twice. In a modification of display system 10g, mirror 7 may be increased in number so that light output from display surface 21 is reflected three times or more. In other words, display system 10g may be configured to reflect light output from display surface 21 a plurality of times. A length of an optical path between display surface 21 and eyes 201 of user 200 relates to a distance between a position at which virtual image 300 being projected is viewable by eyes 201 of user 200 and eyes 201 of user 200. Therefore, in display system 10g, by reflecting light output from display surface 21 a plurality of times, a distance from eyes 201 of user 200 to a position of virtual image 300 being projected can be extended. Display unit 2, the controller, display mirror 3, and mirror 7 are accommodated in single housing 35 in display system 10g. With display system 10g, by making a distance from eyes 201 of user 200 to virtual image 300 identical to the corresponding distance in display system 10 according to the first exemplary embodiment, for example, display system 10g can be reduced in size.

Display system 10g may include an optical component (e.g., lens), other than mirror 7, on optical path OP between display surface 21 and display mirror 3.

The configuration of display system 10g according to the second exemplary embodiment can be appropriately combined with any of the configurations of the modifications to the first exemplary embodiment.

Third Exemplary Embodiment

(1) Outline

Display system 10 according to the present exemplary embodiment is, as illustrated in FIG. 1, a system used in vehicle 100 representing a moving body, for example.

Display system 10 is mounted on main body (moving body main body) 110 of vehicle 100. In display system 10, when image P1 based on a captured image is displayed on display surface 21, image (hereinafter also referred to as reflection image) P2 (see FIGS. 3 and 14) reflected by display mirror 3 is viewed by user 200 (driver of vehicle 100) who is a subject viewing display mirror 3. Display mirror 3 is disposed, proximal to windshield 102, on a front side portion of ceiling portion 101 of main body 110, at a position in a viewing field of user 200, when user 200 seated on front seat 103 faces forward (see FIG. 1). A captured image is output from camera (imaging device) 90 configured to capture a rear view image of vehicle 100. Camera 90 is mounted on main body 110 of vehicle 100. User 200 views reflection image P2 with display mirror 3. Therefore, user 200 views as if image P1 on display surface 21 is displayed in a space that is distal from display mirror 3, based on their eyes (eye balls) 201 (see FIGS. 5A and 5B). In other words, user 200 views as if, in a direction in which user 200 can view display mirror 3, virtual image 300 (see FIGS. 2 and 5A) of image P1 on display surface 21 is displayed at a position in front of vehicle 100.

With the electronic mirror system described in PTL 1, however, a driver of a vehicle views an actual image displayed on a display device including a liquid crystal display. Therefore, for the driver, for example, a distance difference between a distance to a position at which eyes focus on when viewing a road situation in front of the vehicle and a distance to a position at which the eyes focus on when viewing an image on the display device becomes greater, thus increasing an amount of focus adjustment and extending a time for focusing (focal point adjustment).

On the other hand, with display system 10, as illustrated in FIG. 2, for user 200, distance difference ΔL between distance L1 to a position at which eyes 201 focus on when viewing a road situation in front of vehicle 100 and distance L2 to a position at which eyes 201 focus on when viewing virtual image 300 becomes smaller. Therefore, with display system 10, user 200 can reduce an amount of focus adjustment, as well as user 200 can shorten a time for focusing. With display system 10, even when user 200 is aged or far sighted, for example, and accordingly faces difficulty in focusing on a position at a relatively shorter distance, an easy focus adjustment can be achieved.

Display system 10 according to the present exemplary embodiment includes, as illustrated in FIG. 14, display element 4 disposed on optical path OP between display surface 21 and display mirror 3. Here, display element 4 displays, as pattern image PA1, a part of an object present inside a visual field of display mirror 3 and outside visual field FV9 of camera 90 (see FIG. 1). Here, as illustrated in FIG. 15B, display element 4 has first surface 41 and second surface 42, and is configured so that light that is incident on display element 4 via first surface 41 emits display element 4 via second surface 42. Therefore, in display system 10, user 200 viewing display mirror 3 views image P1 displayed on display surface 21 and pattern image PA1 displayed on display element 4 overlapping each other. Therefore, with display system 10, user 200 can advantageously acquire a distance sense to another vehicle, for example, behind vehicle 100, compared with a case when a driver directly views a display device displaying, as an image, an image signal output from an imaging device.

(2) Configuration

(2.1) Whole Configuration of Display System

Display system 10 according to the present exemplary embodiment includes, as illustrated in FIGS. 1, 14, 2, 4, 5A, and 6A, display unit (image forming unit) 2, display mirror 3, and display element 4. Display unit has display surface 21. In FIGS. 1, 2, 4, 5A, and 6A, illustration of display element 4 is omitted. Display system 10 further includes a controller (not illustrated) configured to control display unit 2.

Display surface 21 is configured to display image P1 based on a captured image output from camera 90. Camera 90 is not a component of display system 10. An image element in camera 90 is a Complementary MOS (CMOS) image sensor. The image element is not limited to the CMOS image sensor, but may be a Charge Coupled Device (CCD) image sensor, for example.

Display unit 2 outputs light to form an image. Display unit 2 includes, as illustrated in FIG. 14, liquid crystal panel 22 (Liquid Crystal Display or LCD) and light source device 23. Liquid crystal panel 22 is disposed in front of light source device 23. Light source device 23 is used as a backlight for liquid crystal panel 22. Light source device 23 is a surface light source. Light source device 23 is a side light type light source device using a solid light-emitting element, such as a light emitting diode or a laser diode. Light from light source device 23 passes through liquid crystal panel 22, and is output from display surface 21 of display unit 2. Light output from display surface 21 (output light) is light reflecting an image displayed on liquid crystal panel 22. FIG. 14 schematically illustrates an advancing path (optical path OP) of light output from a point (pixel point) on image P1 displayed on display surface 21 of display unit 2.

In display system 10, a lengthwise of liquid crystal panel 22 represents a lengthwise of reflection image P2, while a widthwise of liquid crystal panel 22 represents a widthwise of reflection image P2. The lengthwise of reflection image P2 represents a lengthwise of virtual image 300 (see FIG. 4), in other words, a direction along a vertical direction in a visual field of user 200. The widthwise of reflection image P2 represents a widthwise of virtual image 300, in other words, a direction along a horizontal direction in the visual field of user 200.

The controller controls display unit 2 (liquid crystal panel 22 and light source device 23). Here, the controller acquires a captured image output from camera 90, and causes display unit 2 to display image P1 based on the captured image. The captured image is a rear view image of vehicle 100 captured and generated by camera 90 mounted on a rear portion of vehicle 100. As an example, the controller causes display unit 2 to display, as image P1, an acquired captured image as is. Here, camera 90 is disposed on the rear portion of vehicle 100 at a center in a left-right direction. Therefore, camera 90 can capture an area behind camera 90 (within visual field FV9 of camera 90). Display system 10 can be applied to electronic mirror system 80. Electronic mirror system 80 includes display system 10, and camera 90 configured to output a captured image to display system 10. Electronic mirror system 80 can be used as an inside mirror of vehicle 100.

The controller includes, for example, a microcomputer mainly including a Central Processing Unit (CPU) and a memory. In other words, the controller is achieved by using a computer including a CPU and a memory. The CPU executes a program stored in the memory, allowing the computer to function as the controller. Herein, the program is recorded in advance in the memory of the controller. However, the program may be provided via a telecommunication line such as the Internet or by being recorded in a recording medium such as a memory card.

Display mirror 3 is a concave mirror. Display mirror 3 includes, as an example, a glass base material, and a reflection film formed on a concave surface of the base material. The reflection film is a metal film, for example.

Display mirror 3 is configured to reflect image P1 displayed on display surface 21. Display mirror 3 in display system 10 reflects, as reflection image P2, only a partial area in image P1 displayed on display surface 21.

In display system 10, as illustrated in FIG. 4, a size of display mirror 3 is determined so that a size of virtual image 300, with respect to whole image P1, on a virtual plane in a space away from user 200 is greater than a size of visual field VF2 of eyes 201 of user 200, which is determined by display mirror 3. Here, in display system 10, the size of display mirror 3 is determined so that an outer peripheral line of visual field VF2 on the above described virtual plane lies inside an outer peripheral line of virtual image 300. Therefore, display system 10 is configured so that a position of reflection image P2 displayed as virtual image 301 at a distal position changes as eyes 201 of user 200 (subject) viewing display mirror 3 move (see FIGS. 5A, 5B, 6A, and 6B). Here, reflection image P2 has a less number of pixels than a number of pixels in image P1 in both the lengthwise and the widthwise of image P1.

For description purposes, two eyes 201 of user 200 hereinafter may be referred to as right eye 201R and left eye 201L to distinguish from each other. In below descriptions with reference to FIGS. 5A and 6A, the term "right side" refers to a right side when viewed by user 200, while the term "left side" refers to a left side when viewed by user 200. In display system 10, when a size of display surface 21 is determined in advance, a radius of curvature of display mirror 3 may be determined so that a size of virtual image 301 is greater than a size of visual field VF2.

FIG. 5A is a conceptual diagram when a center point of a straight line connecting right eye 201R and left eye 201L of user 200 and a center of display surface 21 both lie within vertical surface VP. FIG. 6A is a conceptual diagram when the center point of the straight line connecting right eye 201R and left eye 201L of user 200 moves rightward from the position in FIG. 5A, and right eye 201R moves to a right end of eye-box 203. The term "eye-box 203" used herein denotes an area within which user 200 can view an image without any omissions. More specifically, the term "eye-box 203" used herein denotes an area of view in a whole visual field of eyes 201, in which a part of virtual image 300 is displayed. In display system 10, when eyes 201 of user 200 are within an area of eye-box 203, reflection image P2 is within image P1, as illustrated in FIGS. 5B and 6B.

Figure 7:
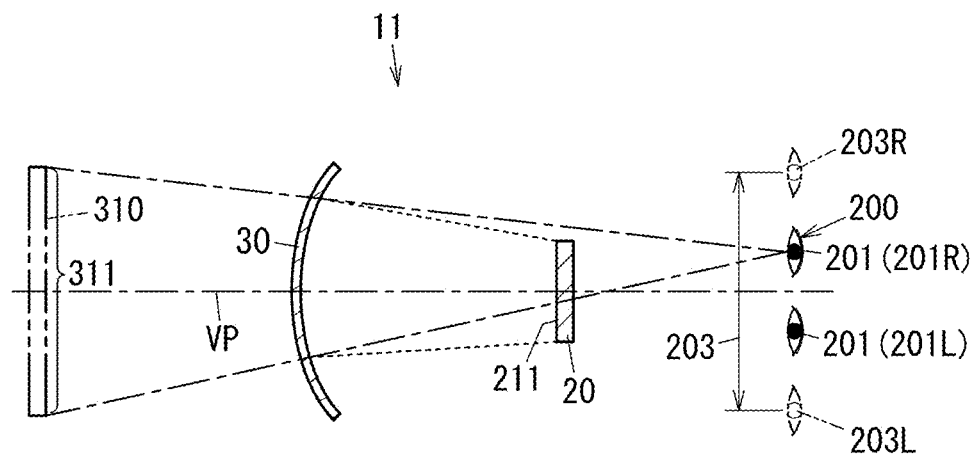
FIG. 7 is a conceptual diagram illustrating a relationship between a visual field of a user of a display system according to a comparative example and a virtual image of an image displayed on a display surface.
Figure 8:
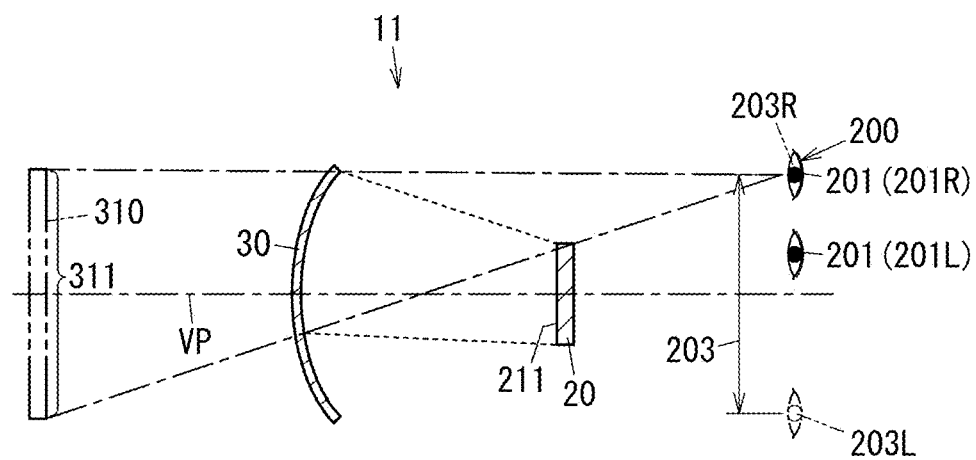
FIG. 8 is a conceptual diagram illustrating a relationship between a visual field of the user of the display system according to the first exemplary embodiment and a virtual image of an image displayed on the display surface.

As illustrated in FIGS. 5A and 6A, virtual image 301 formed when display mirror 3 reflects a part of image P1 represents a part of virtual image 300 formed when image P1 displayed on display surface 21 is fully reflected by a concave mirror 30 according to the comparative example (see FIGS. 7 and 8). In FIG. 5A, a central portion of whole virtual image 300 in both an up-down direction and a left-right direction represents virtual image 301 that is viewable by user 200.

FIG. 5A illustrates an area of virtual image 301 in virtual image 300, which is viewable by right eye 201R of user 200. An area of virtual image 301, which is viewable by left eye 201L of user 200, is plane symmetry to the area of virtual image 301, which is viewable by right eye 201R, with respect to vertical surface VP.

As illustrated in FIG. 6A, as the center point on the straight line connecting right eye 201R and left eye 201L of user 200 moves rightward relative to the position illustrated in FIG. 5A, the area of virtual image 301, which is viewable by right eye 201R of user 200 moves leftward. In FIG. 6A, right eye 201R of user 200 lies at right end 203R of eye-box 203, and left end 301L of virtual image 301, which is viewable by right eye 201R of user 200, is in alignment with left end 300L of virtual image 300.

In contrast to FIG. 6A, as the center point on the straight line connecting right eye 201R and left eye 201L of user 200 moves leftward relative to the position illustrated in FIG. 5A, the area of virtual image 301, which is viewable by left eye 201L of user 200, moves rightward. When left eye 201L of user 200 moves to left end 203L of eye-box 203, right end 301R of virtual image 301, which is viewable by left eye 201L of user 200, is in alignment with right end 300R of virtual image 300.

Therefore, in display system 10, when user 200 moves their face in the left-right direction, similar to a case when user 200 views a conventional inside mirror in a vehicle, the areas of virtual image 301, which are respectively viewable by right eye 201R and left eye 201L, change as user 200 moves their face. Here, as long as right eye 201R and left eye 201L of user 200 are within eye-box 203, an image can be viewed without any omissions.

In display system 10, even when user 200 moves their face in the up-down direction, similar to a case when user 200 views the inside mirror, the areas of virtual image 301, which are respectively viewable by right eye 201R and left eye 201L, change as user 200 moves their face. In other words, when user 200 moves their face upward, the areas of virtual image 301, which are respectively viewable by right eye 201R and left eye 201L, move downward, while, when user 200 moves their face downward, the areas of virtual image 301, which are respectively viewable by right eye 201R and left eye 201L, move upward. Here, as long as right eye 201R and left eye 201L of user 200 are within eye-box 203, an image can be viewed without any omissions.

Display element 4 is disposed on optical path OP between display surface 21 and display mirror 3. Display element 4 is an element configured to display, as pattern image PA1 (see FIGS. 14 and 15A), at least a part of an object present inside a visual field of display mirror 3 and outside visual field FV9 of camera 90. Here, at least parts of objects are pillars 105 of vehicle 100 (see FIG. 1). Pillars 105 used herein denote window pillars diagonally behind a rear seat in vehicle 100. Pattern image PA1 includes, as an example, two image portions PA1*l*, image portion PA12, and image portion PA13. Two image portions PAH respectively correspond, one by one, to two pillars 105 that are separate from each other on left and right of vehicle 100. Image portion PA12 corresponds to a rear portion of ceiling portion 101 coupled to upper ends of two pillars 105 of vehicle 100 (see FIG. 1). Image portion PA13 corresponds to a portion coupled to lower ends of two pillars 105 of vehicle 100. Pattern image PA1 is not limited to the example illustrated in FIG. 14, as long as pattern image PA1 includes at least two image portions PAH which respectively correspond, one by one, to two pillars 105, for example. A thickness of each of image portions PA1*l* corresponding to pillars 105 may be changed in accordance with a vehicle type of vehicle 100, for example, or may be thinner than a thickness of each of pillars 105 of vehicle 100.

Figure 15A:
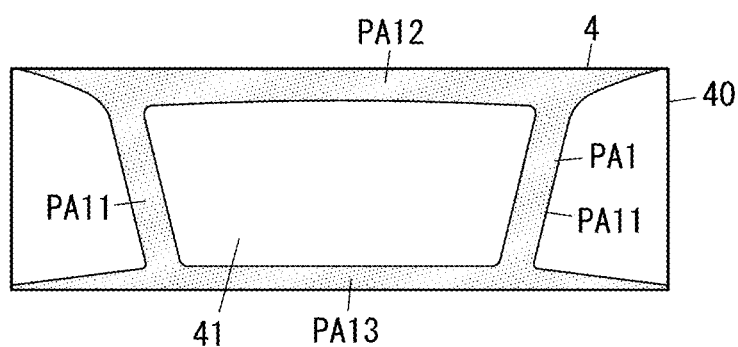
FIG. 15A is a front view of a display element of the display system according to the third exemplary embodiment.
Figure 15B:
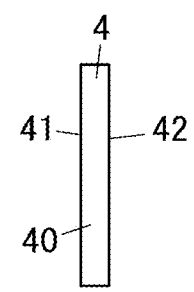
FIG. 15B is a side view of the display element of the display system according to the third exemplary embodiment.
Figure 16A:
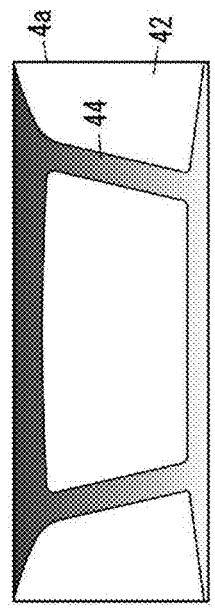
FIG. 16A is a front view of a display element of a display system according to a first modification to the third exemplary embodiment.
Figure 16B:
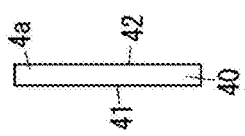
FIG. 16B is a side view of the display element of the display system according to the first modification to the third exemplary embodiment.
Figure 16C:
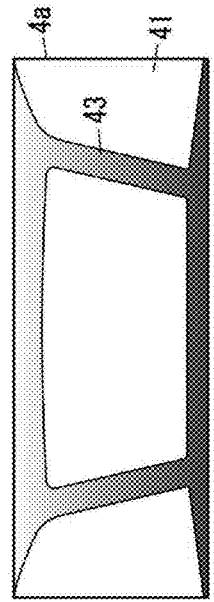
FIG. 16C is a rear view of the display element of the display system according to the first modification to the third exemplary embodiment.
Figure 17:
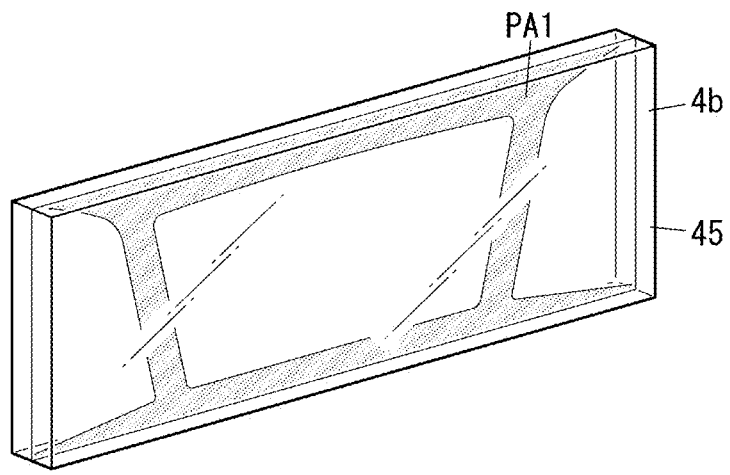
FIG. 17 is a conceptual diagram illustrating a display element of a display system according to a second modification to the third exemplary embodiment.

Display element 4 includes, as illustrated in FIGS. 15A and 15B, transparent plate 40 and pattern image PA1. Transparent plate 40 is formed into a rectangular plate shape, and has first surface 41 and second surface 42 facing each other in a thickness direction. First surface 41 and second surface 42 are each formed into a plane shape. First surface 41 and second surface 42 are parallel to each other. In other words, transparent plate 40 has a constant thickness. Pattern image PA1 is formed on first surface 41 of transparent plate 40. However, this is merely an example. Pattern image PA1 may be formed on second surface 42 of transparent plate 40. Pattern image PA1 is formed through a printing technique. In other words, pattern image PA1 is a printed film having a predetermined pattern.

Display element 4 is disposed, on optical path OP, proximal to display surface 21. Display element 4 is disposed so that, among first surface 41 and second surface 42, second surface 42 serves as display surface 21. On optical path OP, a distance between display element 4 and display surface 21 is shorter than a distance between display element 4 and display mirror 3.

Transparent plate 40 is made of glass, and has transparency, for example. As for the term "having transparency" used herein, a penetration rate with respect to visible light may be 50% or higher, may be preferably 70% or higher, or may be further preferably 90% or higher. The transparent plate is not limited to glass, and may be made of resin, such as acrylic resin.

Display system 10 according to the present exemplary embodiment includes display element 4 between display surface 21 and display mirror 3, allowing user 200 viewing display mirror 3 to view image P1 and pattern image PA1 overlapping each other (see reflection image P2 illustrated in FIG. 14). Therefore, with display system 10, user 200 viewing an image (reflection image P2) displayed by display system 10 can advantageously acquire a distance sense to another following vehicle, for example, by using pattern image PA1 as a reference (mark), compared with a case when a driver directly views a display device displaying, as an image, an image signal output from an imaging device, similar to a conventional electronic mirror system.

In display system 10 including display surface 21 configured to display image P1 based on a captured image, and display mirror 3 configured to reflect image P1 displayed on display surface 21, it is advantageous that a resolution of image P1 displayed on display surface 21 be higher than a limit resolution of virtual image 300 at a position of virtual image 300 being displayed. The term "limit resolution of virtual image 300 at a position of virtual image 300 being displayed" (hereinafter simply referred to as limit resolution) used herein denotes a value determined by a visual distance from eyes 201 of user 200 to virtual image 300 and visual acuity of user 200. A limit resolution refers to a limit value of a resolution identifiable by human's eyes, and can be acquired based on a gap of a Landolt ring used in a visual acuity test, for example. When a visual distance extends longer, a value of a limit resolution becomes smaller. When user 200 has higher visual acuity, a value of a limit resolution becomes greater. A limit resolution can be acquired from a predetermined calculating formula with a value of a visual distance from eyes 201 of user 200 to virtual image 300 and a value of visual acuity of user 200. In display system 10 according to the present exemplary embodiment, display mirror 3 expands and displays a part of an image on display surface 21, thus determining, when a limit resolution is determined, a resolution of image P1 on display surface 21 in accordance with the limit resolution, and setting a resolution of image P1 to a value that is higher than a value of the limit resolution. As described above, once a resolution of image P1 on display surface 21 is determined, virtual image 300 is displayed at a resolution that is higher than a limit resolution at a position of virtual image 300 being displayed, thus providing, to user 200 viewing virtual image 300, a sense of depth and a sense of solidity in virtual image 300, as if user 200 is viewing a mirror. In particular, while vehicle 100 is traveling, a high-definition image moves as vehicle 100 moves, and user 200 can further acquire a sense of solidity.

In display system 10, housing 28 accommodating display unit 2, display element 4, and the controller, and housing 38 accommodating display mirror 3 are separate from each other. However, this is merely an example, and display unit 2, display element 4, the controller, and display mirror 3 may be accommodated in a single housing, for example.

(2.2) Operation of Electronic Mirror System

Operation of electronic mirror system 80 will now be described.

For example, when a battery of vehicle 100 supplies power to electronic mirror system 80, and an Electronic Control Unit (ECU) enters a control signal causing electronic mirror system 80 to start operating, electronic mirror system 80 starts operating.

For example, when the ECU of vehicle 100 enters a control signal to the controller, the controller causes camera 90 to capture a rear view image of vehicle 100 at a predetermined frame rate, and acquires image data on the captured image from camera 90.

When the image data on the captured image is entered from camera 90, the controller causes display unit 2 to display, on display surface 21, image P1 based on the captured image.

A part of image P1 displayed on display surface 21 of display unit 2 is reflected by display mirror 3. Therefore, user 200 can view reflection image P2 on which image P1 and pattern image PA1 overlap each other.

(3) Modifications

Third exemplary embodiment is merely one of various exemplary embodiments of the present disclosure. The third exemplary embodiment can be variously modified in accordance with a design, for example, as long as the object of the present disclosure can be achieved.

(3.1) First Modification

Display system 10 according to the first modification differs from display system 10 according to the third exemplary embodiment in terms of display element 4a (see FIGS. 16A, 16B, and 16C) having a configuration that differs from the configuration of display element 4 of display system 10 according to the third exemplary embodiment. Elements similar to those in the third exemplary embodiment are given identical reference signs, and description of such elements is omitted as appropriate.

Display element 4a includes transparent plate 40, first pattern image element 43, and second pattern image element 44. Transparent plate 40 has first surface 41 and second surface 42 facing each other in a thickness direction. In display element 4a, on optical path OP, first surface 41 is proximal to display mirror 3, while second surface 42 is proximal to display surface 21.

First pattern image element 43 is formed on first surface 41 of transparent plate 40. First pattern image element 43 has a shape identical to a shape of pattern image PA1, and originates pattern image PA1. Second pattern image element 44 is formed on second surface 42 of transparent plate 40. Second pattern image element 44 has a shape identical to a shape of pattern image PA1, and originates pattern image PA1. First pattern image element 43 and second pattern image element 44 are disposed so as to overlap each other in the thickness direction of transparent plate 40.

In display element 4a, brightness distribution in first pattern image element 43 and brightness distribution in second pattern image element 44 differ from each other.

Among first pattern image element 43 and second pattern image element 44, on first pattern image element 43 that is proximal to display mirror 3 on optical path OP, a portion of an actual object corresponding to pattern image PA1, which is relatively proximal to display mirror 3, becomes brighter. On the other hand, among first pattern image element 43 and second pattern image element 44, on second pattern image element 44 that is distal from display mirror 3 on optical path OP, a portion of the actual object corresponding to pattern image PA1, which is relatively distal from display mirror 3, becomes brighter. In display system 10, light from display unit 2 enters into display element 4a, and exits from display element 4a. Therefore, brightness distribution in first pattern image element 43 and brightness distribution in second pattern image element 44 differ from each other. In other words, display element 4a is a Depth-Fused 3-D (DFD) display element. Therefore, user 200 viewing display mirror 3 of display system 10 can view an image further three-dimensionally due to illusion, and thus can easily acquire a distance sense to another following vehicle, for example.

(3.2) Second Modification

Display system 10 according to the second modification differs from display system 10 according to the third exemplary embodiment in terms of display element 4b (see FIG. 17) having a configuration that differs from the configuration of display element 4 of display system 10 according to the third exemplary embodiment.

Display element 4b includes transparent block 45, and pattern image PA1 formed inside transparent block 45. Display element 4b is three-dimensional (3D) crystal glass, in which transparent block 45 made of crystal glass is provided, and pattern image PA1 based on a modified portion of crystal glass is provided. The modified portion is formed by laser machining crystal glass.

(3.3) Third Modification

Display system 10 according to the third modification differs from display system 10 according to the third exemplary embodiment in terms of display element 4c (see FIGS. 18A and 18B) having a configuration that differs from the configuration of display element 4 of display system 10 according to the third exemplary embodiment.

Display element 4c is a transparent display. The transparent display is a display capable of displaying pattern image PA1 on a transparent screen.

Figure 18A:
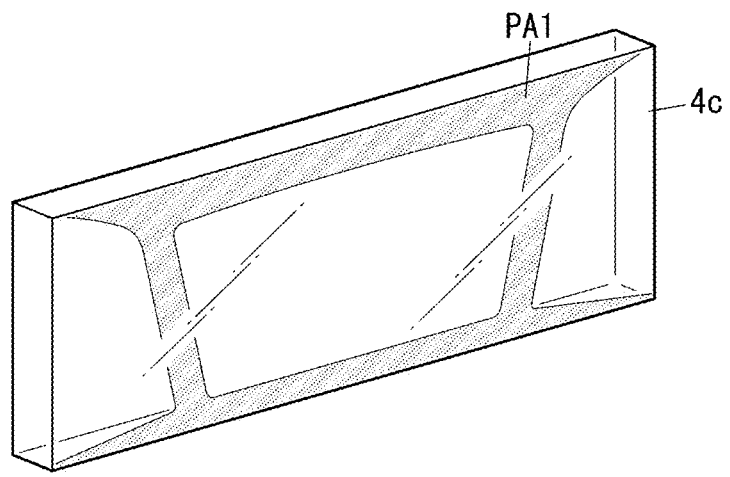
FIG. 18A is a conceptual diagram illustrating, with a pattern image displayed, a display element of a display system according to a third modification to the third exemplary embodiment.
Figure 18B:
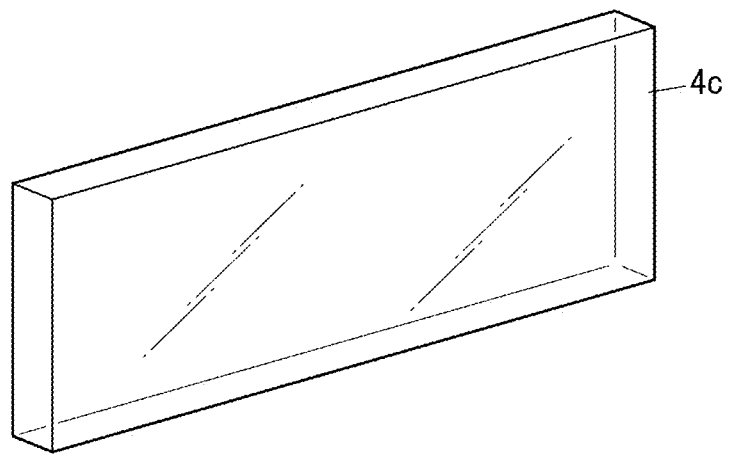
FIG. 18B is a conceptual diagram illustrating the display system according to the third modification to the third exemplary embodiment with no pattern image displayed.

The transparent display is a transparent liquid crystal display. However, this is merely an example. The transparent display may be an OLED display, for example. Display element 4c is controlled by the controller to switch between a state in which pattern image PA1 is displayed, as illustrated in FIG. 18A, and a state in which pattern image PA1 is not displayed, as illustrated in FIG. 18B, for example.

(3.4) Fourth Modification

Figure 19:
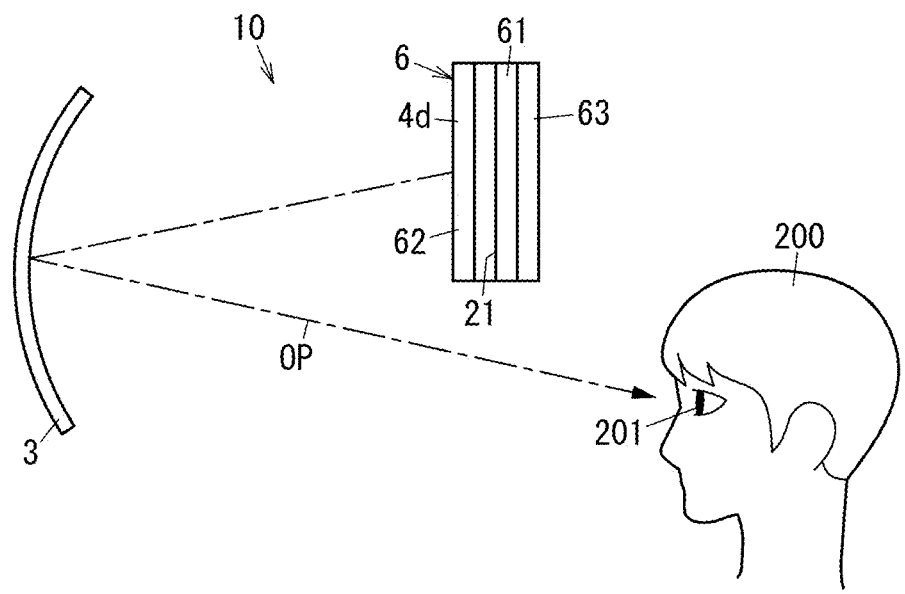
FIG. 19 is a conceptual diagram illustrating a display element of a display system according to a fourth modification to the third exemplary embodiment.

Display system 10 according to the fourth modification differs from display system 10 according to the third exemplary embodiment in terms of Depth-Fused 3-D (DFD) display 6, different from display system 10 according to the third exemplary embodiment (see FIG. 19).

DFD display 6 is a display utilizing a three dimensional illusion phenomenon. DFD display 6 includes two image display panels 61, 62. DFD display 6 further includes light source device 63. In DFD display 6, among two image display panels 61, 62, a screen of image display panel 61 (hereinafter also referred to as first image display panel 61) that is distal from display mirror 3 serves as display surface 21. In DFD display 6, image display panel 62 (hereinafter also referred to as second image display panel 62) that is proximal to display mirror 3 serves as display element 4d configured to display pattern image PA1. In other words, first image display panel 61 is configured to display image P1 based on a captured image. Second image display panel 62 is configured to display pattern image PA1.

Two image display panels 61, 62 are liquid crystal panels. Light source device 63 is used as a backlight for two image display panels 61, 62. Light source device 63 is a surface light source. Two image display panels 61, 62 and light source device 63 of DFD display 6 are controlled by the controller.

(3.5) Fifth Modification

Figure 20:
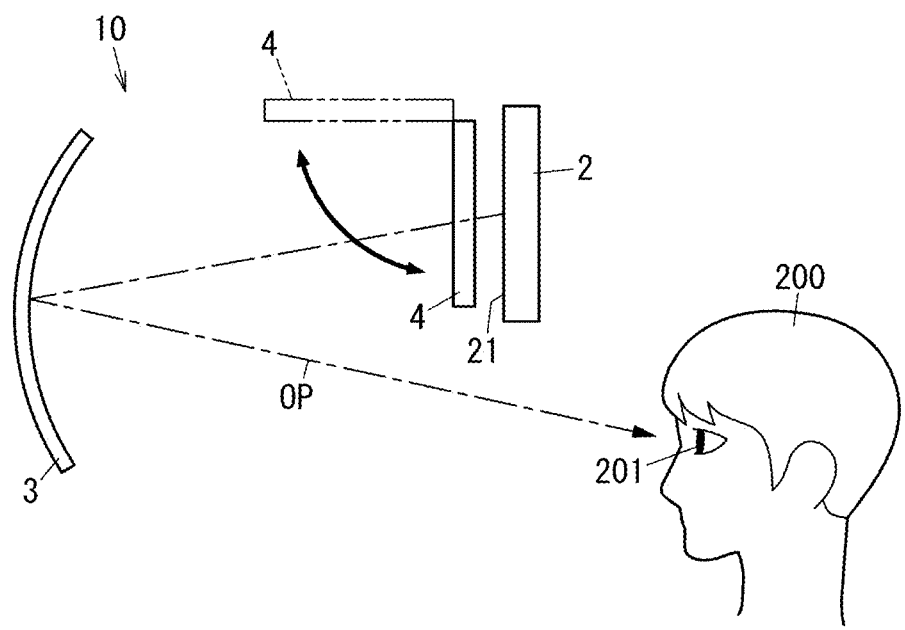
FIG. 20 is a conceptual diagram illustrating a configuration of a display system according to a fifth modification to the third exemplary embodiment.

Display system 10 according to the fifth modification is substantially identical to display system 10 according to the third exemplary embodiment, but differs from display system 10 according to the third exemplary embodiment in that display element 4 is rotatable between a first position on optical path OP between display surface 21 and display mirror 3 and a second position outside optical path OP, as illustrated in FIG. 20.

(3.6) Sixth Modification

Figure 21:
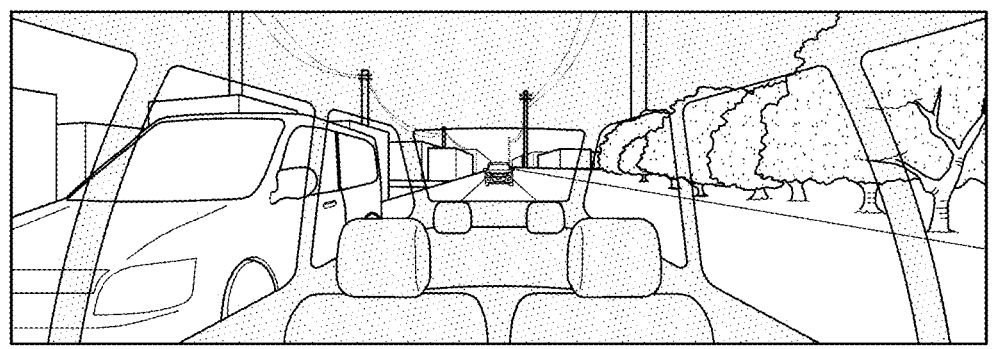
FIG. 21 is a conceptual diagram illustrating an image reflected by a display mirror in a display system according to a sixth modification to the third exemplary embodiment.

Display system 10 according to the sixth modification is configured to display an image acquired by combining and overlapping captured images respectively output from camera 90 (first camera 90) configured to capture a rear view image of vehicle 100, a second camera configured to capture a right rear view image of vehicle 100, and a third camera configured to capture a left rear view image of vehicle 100, with an object, such as a pillar of vehicle 100. FIG. 21 is an example of a conceptual diagram illustrating an image reflected by a display mirror in display system 10 according to the sixth modification.

(3.7) Other Modifications

The following includes modifications to the third exemplary embodiment, other than the first to sixth modifications.

Display unit 2 is not limited to a configuration including liquid crystal panel 22 and light source device 23. Display unit 2 may be configured, with respect to a diffuse transmission type screen, to allow laser light to perform scanning from behind the screen, and to render an image on the screen, for example. Display unit 2 may also be configured, with respect to a diffuse transmission type screen, to allow a projector to project an image from behind the screen, for example. Display unit 2 may also be a light emitting type display panel including an Organic Light Emitting Diode (OLED), for example.

An image based on a captured image is not limited to the captured image itself, but may be an image acquired by image processing the captured image and a Computer Graphics (CG) image created based on the captured image, for example. For example, since an image captured with camera 90 at night becomes darker, an image based on a captured image may be an image acquired by performing a brightness correction on an image captured with camera 90. An image based on a captured image may be an image in which an obstacle is extracted from the captured image of camera 90, and then a Computer Graphics (CG) image illustrating the obstacle is superimposed on the captured image.

In display system 10, a number of pixels in the lengthwise of reflection image P2 is smaller than a number of pixels in the lengthwise of image P1, and a number of pixels in the widthwise of reflection image P2 is smaller than a number of pixels in the widthwise of image P1. However, this is merely an example. For example, in display system 10, only a number of pixels in one of the lengthwise and the widthwise of reflection image P2 may be smaller than a number of pixels in the corresponding direction (lengthwise or widthwise) of image P1.

In display system 10, pattern image PA1 of display element 4 may be a translucent printed film. Therefore, blind spots are reduced for user 200 viewing display mirror 3.

Display system 10 may include a DFD display instead of display element 4. A DFD display is a display utilizing a three dimensional illusion phenomenon. In this case, the DFD display includes, on optical path OP, a first liquid crystal panel disposed to face display mirror 3, and a second liquid crystal panel disposed to face display surface 21. Here, the first liquid crystal panel displays an image containing a first pattern image element having brightness distribution similar to the brightness distribution in the first pattern image element described in the first modification. The second liquid crystal panel displays an image containing a second pattern image element having brightness distribution similar to the brightness distribution in the second pattern image element described in the first modification.

In display system 10, display element 4 is disposed parallel to display surface 21. However, display element 4 may be disposed so as to be away from display surface 21 with respect to its upper and lower sides. Therefore, user 200 viewing display system 10 can view an image three-dimensionally, compared with a case in which display element 4 is disposed parallel to display surface 21.

Display element 4 is configured such that a pattern image is formed on the flat plate. However, a three-dimensional structure may be applied. Therefore, user 200 viewing display system 10 can view an image three-dimensionally, compared with a case in which display element 4 is a pattern image on a flat plate.

In vehicle 100, cameras 90 may be disposed so as to capture rear view images of areas on both sides of vehicle 100, which have been viewable with conventional door mirrors or fender mirrors. In this case, electronic mirror system 80 may be used as rear view mirrors for replacements of conventional door mirrors or fender mirrors.

A moving body to which electronic mirror system 80 is applied is not limited to vehicle 100. For example, electronic mirror system 80 is applicable to moving bodies other than vehicle 100, such as motorcycles, trains, airplanes, construction machines, and ships. In other words, a moving body main body is not limited to a vehicle, but may be a main body of a moving body other than vehicle 100, such as a motorcycle, a train, an airplane, a construction machine, or a ship. Further, electronic mirror system 80 may be used in an amusement facility or a medical facility, for example, instead of a moving body.

Fourth Exemplary Embodiment

Figure 22:
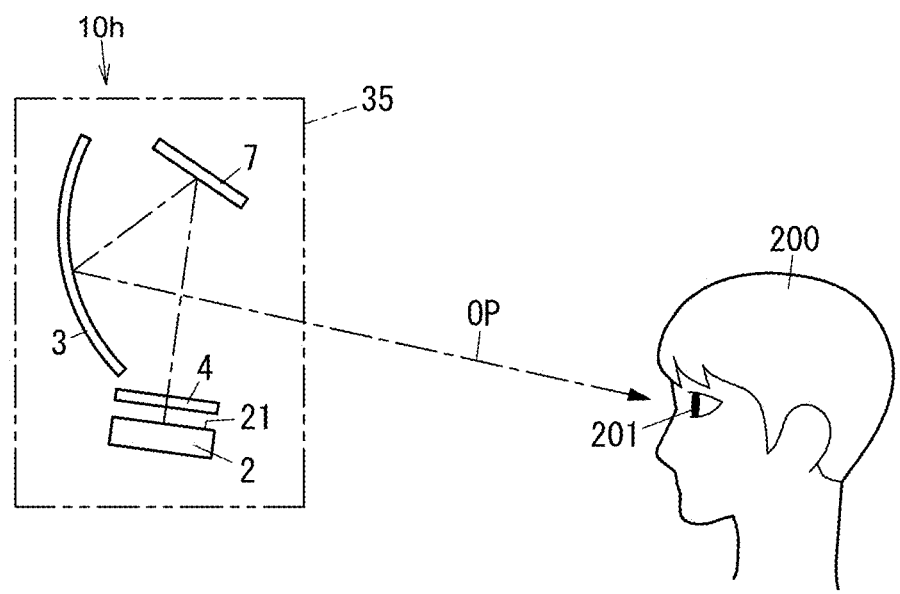
FIG. 22 is a conceptual diagram illustrating a configuration of a display system according to a fourth exemplary embodiment.

Display system 10h according to the present exemplary embodiment differs from, as illustrated in FIG. 22, display system 10 according to the third exemplary embodiment in terms of mirror 7 disposed on optical path OP between display surface 21 and display mirror 3. Hereinafter, elements similar to those in the third exemplary embodiment are given identical reference signs, and description of such elements is omitted as appropriate.

Mirror 7 is configured to reflect, toward display mirror 3, image P1 from display surface 21. Display element 4, mirror 7, and display mirror 3 are disposed on optical path OP between display surface 21 and display mirror 3 (optical path of light output from display surface 21) in an order of display element 4, mirror 7, and display mirror 3.

In other words, mirror 7 is disposed on an opposite side to light source device 23, when viewed from liquid crystal panel 22, in other words, in front of liquid crystal panel 22, so that light from display surface 21 (hereinafter also referred to as output light) is incident on mirror 7 via display element 4. Mirror 7 reflects, toward display mirror 3, light output from display surface 21. Display mirror 3 is disposed at a position so that light output from display surface 21 and reflected by mirror 7 is incident on display mirror 3. Display mirror 3 reflects light output from display surface 21 and reflected by mirror 7 toward eyes 201 of user 200.

Mirror 7 is a plane mirror. Mirror 7 includes, as an example, a glass base material, and a reflection film made of a metal film formed on a surface of the base material. Therefore, on mirror 7, light output from display surface 21 is reflected on a surface of the reflection film.

In display system 10h according to the present exemplary embodiment, display unit 2, mirror 7, and display mirror 3 are respectively disposed at apex positions of a triangle formed on a vertical surface. The term "vertical surface" used herein denotes a plane containing the lengthwise (vertical direction) of an image displayed on display unit 2 and an advancing direction (optical axis) of output light. In display system 10h, light output from display surface 21 is first reflected by mirror 7, and then further reflected by display mirror 3.

Therefore, in display system 10h according to the present exemplary embodiment, light output from display surface 21 is reflected twice. In a modification of display system 10h, mirror 7 may be increased in number so that light output from display surface 21 is reflected three times or more. In other words, display system 10h may be configured to reflect light output from display surface 21 a plurality of times. A length of an optical path between display surface 21 and eyes 201 of user 200 relates to a distance between a position at which virtual image 300 being projected is viewable by eyes 201 of user 200 and eyes 201 of user 200. Therefore, in display system 10h, by reflecting light output from display surface 21 a plurality of times, a distance from eyes 201 of user 200 to a position of virtual image 300 being projected can be extended.

Display unit 2, the controller, display element 4, display mirror 3, and mirror 7 are accommodated in single housing 35 in display system 10h. With display system 10h, by making a distance from eyes 201 of user 200 to virtual image 300 identical to the corresponding distance in display system 10 according to the third exemplary embodiment, for example, display system 10h can be reduced in size.

Display system 10h may include an optical component (e.g., lens), other than mirror 7, on optical path OP between display surface 21 and display mirror 3.

The configuration of display system 10h according to the fourth exemplary embodiment (including the modifications) can be appropriately combined with the configurations of the first to sixth modifications of the third exemplary embodiment.

(Summary)

As described above, display system (10; 10g) according to a first aspect includes display surface (21) and display mirror (3). Display surface (21) is configured to display image (P1) based on a captured image. Display mirror (3) is configured to reflect, as reflection image (P2), only a partial area in image (P1) displayed on display surface (21). Display system (10; 10g) is configured so that a position of reflection image (P2) changes as a point of view of a subject (e.g., user 200) viewing display mirror (3) moves.

With this configuration, display mirror (3) reflects, as reflection image (P2), only a partial area in image (P1) displayed on display surface (21), different from a mirror reflecting a whole area in an image displayed on a liquid crystal display. Here, display system (10; 10g) is configured so that a position of reflection image (P2) of image (P1) changes as a point of view (eyes 201 of user 200) of a subject (e.g., user 200) viewing display mirror (3) moves. Therefore, display system (10; 10g) is capable of advantageously providing a sense of solidity to a person (subject) viewing a displayed image.

In display system (10; 10g) according to a second aspect, in the first aspect, when a point of view of a subject (e.g., user 200) is within an area of eye-box (203), reflection image (P2) is within image (P1).

With this configuration, an image can be viewed without any omissions.

In display system (10; 10g) according to a third aspect, in the first or second aspect, display mirror (3) is a concave mirror.

With this configuration, a person viewing display mirror (3) of display system (10; 10g) can easily view reflection image (P2) further three-dimensionally, compared with a case in which display mirror (3) is a plane mirror.

Display system (10; 10g) according to a fourth aspect further includes, in any one of the first to third aspects, mirror (7) disposed on optical path (OP) between display surface (21) and display mirror (3), and configured to reflect image (P1) from display surface (21) to display mirror (3).

With this configuration, a length of the optical path between display surface (21) and a point of view of a subject (e.g., user 200) can be extended.

In display system (10; 10g) according to a fifth aspect, in any one of the first to fourth aspects, reflection image (P2) has a less number of pixels than a number of pixels in image (P1) in both the lengthwise and the widthwise of image (P1).

With this configuration, even when a position of reflection image (P2) changes in either or both of the lengthwise and the widthwise of image (P1), the image can be viewed without any omissions.

Electronic mirror system (80) according to a sixth aspect includes display system (10; 10g) according to any one of the first to fifth aspects, and camera (90) configured to output a captured image to display system (10; 10g).

This configuration is capable of advantageously providing a sense of solidity to a person (subject) viewing a displayed image.

A moving body (e.g., vehicle 100) according to a seventh aspect includes electronic mirror system (80) according to the sixth aspect, and a moving body main body (e.g., main body 110 of vehicle 100) mounted with electronic mirror system (80).

This configuration is capable of advantageously providing a sense of solidity to a person (subject) viewing a displayed image.

Display system (10; 10g) according to an eighth aspect includes display surface (21) configured to display image (P1) based on a captured image, and display mirror (3) configured to reflect image (P1) displayed on display surface (21). A resolution of display surface (21) is higher than a limit resolution of an image displayed at a predetermined position by display mirror (3). The eighth aspect is an aspect that can be solely implemented, in which any one of the first to fifth aspects is not essential as a prerequisite.

Display system (10; 10h) according to a ninth aspect includes display surface (21), display mirror (3), and display element (4; 4a; 4b; 4c; 4d). Display surface (21) is configured to display image (P1) based on a captured image output from camera (90). Display mirror (3) is configured to reflect image (P1) displayed on display surface (21). Display element (4; 4a; 4b; 4c; 4d) is disposed on optical path (P1) between display surface (21) and display mirror (3). Display element (4) displays, as pattern image (PA1), at least a part of an object present inside a visual field of display mirror (3) and outside visual field (FV9) of camera (90).

With this configuration, a subject viewing display mirror (3) views three-dimensionally image (P1) and pattern image (PA1) overlapping each other. Therefore, with display system (10; 10h), a person viewing an image displayed by display system (10; 10h) can advantageously acquire a distance sense, by using pattern image (PA1) as a reference (mark), compared with a case when a person directly views a display device displaying, as an image, an image signal output from an imaging device, similar to a conventional electronic mirror system.

In display system (10; 10h) according to a tenth aspect, in the ninth aspect, display element (4) includes transparent plate (40) and pattern image (PA1). Transparent plate (40) has first surface (41) and second surface (42) facing each other in the thickness direction. Pattern image (PA1) is formed on one of first surface (41) and second surface (42).

With this configuration, display element (4) can be achieved in a relatively simple configuration.

In display system (10; 10h) according to an eleventh aspect, in the ninth aspect, display element (4a) includes transparent plate (40), first pattern image element (43), and second pattern image element (44). Transparent plate (40) has first surface (41) and second surface (42) facing each other in the thickness direction. First pattern image element (43) is formed on first surface (41) of transparent plate (40). First pattern image element (43) has a shape identical to a shape of pattern image (PA1), and originates pattern image (PA1). Second pattern image element (44) is formed on second surface (42) of transparent plate (40). Second pattern image element (44) has a shape identical to a shape of pattern image (PA1), and originates pattern image (PA1). Brightness distribution in first pattern image element (43) and brightness distribution in second pattern image element (44) differ from each other.

With this configuration, a person viewing display mirror (3) of display system (10; 10h) can view an image further three-dimensionally due to illusion, and thus can easily acquire a distance sense. In display system (10; 10h) according to a twelfth aspect, in the ninth aspect, display element (4b) includes transparent block (45), and pattern image (PA1) formed inside transparent block (45).

This configuration advantageously prevents, as much as possible, quality of an image from lowering due to dirt and scratch, for example, on pattern image (PA1).

In display system (10; 10h) according to a thirteenth aspect, in the ninth aspect, display element (4c) is a transparent display.

This configuration advantageously prevents, as much as possible, quality of an image from lowering due to dirt and scratch, for example, on pattern image (PA1), advantageously disallows pattern image (PA1) from being displayed as required, and advantageously easily allows a change in pattern image (PA1).

Display system (10; 10*h*) according to a fourteenth aspect includes, in the ninth aspect, DFD display (6) including two image display panels (61, 62). Among two image display panels (61, 62), a screen of image display panel (61) that is distal from display mirror (3) serves as display surface (21), while image display panel (62) that is proximal to display mirror (3) serves as display element (4*d*).

This configuration advantageously disallows pattern image (PA1) from being displayed as required, and advantageously allows a change in pattern image (PA1).

In display system (10; 10*h*) according to a fifteenth aspect, in any one of the first to sixth aspect, display mirror (3) is a concave mirror.

With this configuration, a person viewing display mirror (3) of display system (10; 10*h*) can view an image further three-dimensionally, and thus can easily acquire a distance sense, compared with a case in which display mirror (3) is a plane mirror.

Electronic mirror system (80) according to a sixteenth aspect includes display system (10; 10*h*) according to any one of the first to seventh aspects, and camera (90) configured to output a captured image to display system (10; 10*h*).

With this configuration, a person viewing an image displayed by display system (10; 10*h*) can advantageously acquire a distance sense, compared with a case when a person directly views a display device displaying, as an image, an image signal output from an imaging device, similar to a conventional electronic mirror system.

A moving body (e.g., vehicle 100) according to a seventeenth aspect includes electronic mirror system (80) according to the sixteenth aspect, and a moving body main body (e.g., main body 110 of vehicle 100) mounted with electronic mirror system (80).

With this configuration, a person viewing an image displayed by display system (10; 10*h*) of electronic mirror system (80) can advantageously acquire a distance sense.

Display system (10; 10*h*) according to an eighteenth aspect includes display surface (21) configured to display image (P1) based on a captured image, and display mirror (3) configured to reflect image (P1) displayed on display surface (21). A resolution of display surface (21) is higher than a limit resolution of an image displayed at a predetermined position by display mirror (3). The eighteenth aspect is an aspect that can be solely implemented, in which any one of the first to seventh aspects is not essential as a prerequisite.

The invention claimed is:

1. A display system comprising:
a display having a display surface configured to display an image based on a captured image output from a camera;
a concave mirror having a reflection surface configured to reflect, as a reflection image, only a part of the image displayed on the display surface, the reflection image being viewed as a virtual image on a virtual plane in a space away from a user,
wherein:
the size of the reflection surface is set such that a size of the virtual image on the virtual plane surrounds and is greater than a size of a predetermined visual field of the user, the predetermined visual field of the user being set according to the size of the reflection surface; and
a resolution of the image displayed on the display is greater than a resolution of the virtual image.

2. The display system according to claim 1 further comprising a mirror disposed on an optical path between the display surface and the concave mirror, the mirror being configured to reflect the image from the display surface to the concave mirror.

3. The display system according to claim 1, wherein the reflection image has a fewer number of pixels than a number of pixels in the image displayed on the display surface in both a lengthwise and a widthwise of the image displayed on the display surface.

4. The display system according to claim 1, wherein the only a number of pixels in one of a lengthwise and a widthwise direction of the reflection image is smaller than a number of pixels in the corresponding direction of the image displayed on the display surface.

5. The display system according to claim 1, wherein the display surface is configured to switch whether to display a guide pattern image to be used to adjust a position at which the reflection image is located.

6. An electronic mirror system comprising:
the display system according to claim 1,
wherein the camera is configured to output the captured image to the display system.

7. The display system according to claim 1,
wherein the display system is configured so that a position of the reflection image changes as a point of view of the user viewing the display mirror moves, and
wherein, when the point of view of the user is within an area of an eye-box, the position of the reflection image is within the image displayed on the display surface.

8. The display system according to claim 1, wherein a size of the display surface is smaller than the size of the reflection surface.

9. The display system according to claim 1, wherein:
a part of the display surface corresponds to the predetermined visual field, and
a size of the part of the display surface is smaller than the size of the reflection surface.

* * * * *